(12) United States Patent  
Geisler et al.

(10) Patent No.: US 6,252,989 B1
(45) Date of Patent: Jun. 26, 2001

(54) FOVEATED IMAGE CODING SYSTEM AND METHOD FOR IMAGE BANDWIDTH REDUCTION

(75) Inventors: Wilson Geisler; Philip Kortum, both of Austin, TX (US)

(73) Assignee: Board of the Regents, The University of Texas System, Austin, TX (US)

( * ) Notice: Subject to any disclaimer, the term of this patent is extended or adjusted under 35 U.S.C. 154(b) by 0 days.

(21) Appl. No.: 08/997,109

(22) Filed: Dec. 23, 1997

Related U.S. Application Data

(60) Provisional application No. 60/034,549, filed on Jan. 7, 1997.

(51) Int. Cl.[7] .............................. G06K 9/36; G09G 5/00; H04N 7/12; H04N 1/41
(52) U.S. Cl. ........................ 382/232; 382/236; 382/240; 382/248; 345/202; 348/387.1; 348/390.1; 358/426
(58) Field of Search .................................... 382/232, 239, 382/248, 250, 166, 236, 240, 244; 345/202; 348/384.1, 387.1, 395, 398, 403, 390.1; 358/426

(56) References Cited

U.S. PATENT DOCUMENTS

| | | | |
|---|---|---|---|
| 5,067,019 | 11/1991 | Juday et al. | 358/160 |
| 5,103,306 | 4/1992 | Weiman et al. | 358/133 |
| 5,144,688 | * 9/1992 | Bovir et al. | 382/166 |
| 5,175,617 | 12/1992 | Wallace et al. | 358/133 |
| 5,208,872 | 5/1993 | Fisher | 382/42 |
| 5,282,255 | 1/1994 | Bovik et al. | 382/17 |
| 5,331,414 | * 7/1994 | Golin | 348/390 |

(List continued on next page.)

FOREIGN PATENT DOCUMENTS

0293041A1 * 11/1988 (EP) .

OTHER PUBLICATIONS

Silsbee, et al "Visual Pattern Image Sequence Coding", IEEE, pp. 291–301, 1993.*

Basu, et al "Videoconferencing Using Spatially Varying Sensing With Multiple and Moving Foveae", IEEE, pp. 30–34, 1994.*

Baron, et al "Exploring with a Foveated Robot Eye System", IEEE, pp. 377–380, 1994.*

(List continued on next page.)

*Primary Examiner*—Andrew W. Johns
*Assistant Examiner*—Daniel G. Mariam
(74) *Attorney, Agent, or Firm*—Fulbright & Jaworski

(57) ABSTRACT

A foveated imaging system, which can be implemented on a general purpose computer and greatly reduces the transmission bandwidth of images has been developed. This system has demonstrated that significant reductions in bandwidth can be achieved while still maintaining access to high detail at any point in an image. The system is implemented with conventional computer, display, and camera hardware. It utilizes novel algorithms for image coding and decoding that are superior both in degree of compression and in perceived image quality and is more flexible and adaptable to different bandwidth requirements and communications applications than previous systems. The system utilizes novel methods of incorporating human perceptual properties into the coding the decoding algorithms providing superior foveation. One version of the system includes a simple, inexpensive, parallel pipeline architecture, which enhances the capability for conventional and foveated data compression. Included are novel applications of foveated imaging in the transmission of pre-recorded video (without eye tracking), and in the use of alternate pointing devices for foveation.

13 Claims, 19 Drawing Sheets

U.S. PATENT DOCUMENTS

| | | | | |
|---|---|---|---|---|
| 5,495,292 | * | 2/1996 | Zhang et al. | 348/407 |
| 5,754,702 | * | 5/1998 | Simpson | 382/240 |
| 5,764,807 | * | 6/1998 | Pearlman et al. | 382/240 |
| 5,825,313 | * | 10/1998 | Kondo et al. | 341/67 |
| 5,883,979 | * | 3/1999 | Beretta et al. | 382/251 |
| 5,886,794 | * | 3/1999 | Kondo et al. | 358/428 |

OTHER PUBLICATIONS

Yamamoto "An Active Foveated Vision System : Attentional mechanisms and Scan Path Convergence Measures", Academic Press, pp. 50–65, 1996.*

Howard, *Display Characteristics of Example Light–Valve Projectors*, AFHRL–TP–88–44, Operations Training Division, Air Force Human Resources Laboratory, Williams AFB, AZ, 1989.

Strang, G. and Nguyen, T., *Wavelets and Filter Banks*, Wellesley–Cambridge Press, 1996. (Text Book).

E.H. Adelson, E. Simoncelli and Hingorani, Orthogonal Pyramid Transforms for Image Coding. *WA: SPIE Optical Engineering Press*, 1987.

Benderson, Wallace, Schwarts, "A Miniature Pan–Tilt Actuator: The Spherical Pointing Motor," *IEEE Transactions Robotics and Automation*, 10:298–308, 1994.

P.J. Burt and E. J. Adelson, The Laplacian Pyramid as a Compact Image Code. *IEEE Transactions on Communications*. 31:532–540.1983.

Geisler and Banks, "Visual Performance," *In: Handbook of Optics vol. 1: Fundamentals, Techniques and Design*, 2nd Ed., M. Bass, ed., New York, McGraw–Hill, 1995.

Juday and Fisher, "Geometric Transformations for Video Compression and Human Teleoperator Ddisplay," *SPIE Proceedings: Optical Pattern Recognition*, 1053:116–123, 1989.

P.T. Kortum and W.S. Geisler, Implementation of a Foveated Image–Coding System for Bandwidth Reduction of Video Images. Human Vision and Electronic Imaging. SPIE:2657, 350–360, 1996.

A. Said and W.A. Pearlman, A New, Fast and Efficient Image Codec Based on Set Partitioning in Hierarchical Trees. *IEEE Transactions on Circuits and Systems for Video Technology*, 6:243–250, 1996.

J.M. Shapiro, Embedded Image Coding Using Zerotrees of Wavelets Coefficient. *IEEE Transactions on Signal Processing.* 41:3445–3462, 1993.

Warner, Serfoss, Hubbard, *In: Effects of Area–of–Interest Display Characteristics on Visual Search Performance and Head Movements in Simulated Low–Level Flight*, Al–TR–1993–0023, Armstrong Laboratory, Human Resources Directorate, Aircrew Training Division, Williams AFB, AZ, 1993.

Wassel, Grünert, Röhrenbeck, Boycott, "Retinal Ganglion Cell Density and Cortical Magnification Factor in the Primate," *Vision Research*, 30:1897–1911, 1990.

Weiman, "Video Compression Via Log Polar Mapping." *SPIE Proceedings: Real Time Image Processing II*, 1295–266–277, 1990.

Wilson, Levi, Maffei, Rovamo, Devalois, "The Perception of Form: Retina to Striate Cortex," *In: Visual Perception: The Neurophysiological Foundations*, L.S. and J.S. Werner, eds., San Diego, Academic Press, 232–272, 1990.

* cited by examiner

Fig. 17

| a11 | a12 | a13 | a14 | a15 |
|-----|-----|-----|-----|-----|
| a21 | a22 | a23 | a24 | a25 |
| a31 | a32 | a33 | a34 | a35 |
| a41 | a42 | a43 | a44 | a45 |

| b11 | b12 |
|-----|-----|
| b21 | b22 |

FOVEATED IMAGE CODING SYSTEM AND METHOD FOR IMAGE BANDWIDTH REDUCTION

RELATED APPLICATIONS

This application claims priority under U.S. Title 35 § 119 from provisional application No. 60/034,549 filed Jan. 7, 1997.

1.0. RIGHTS IN THE INVENTION

The United States government owns rights in the present invention pursuant to grant numbers AF94T004 and F49620-93-1-0307 from the Air Force Office of Sponsored Research.

1.1. FIELD OF THE INVENTION

The present invention relates generally to the field of image data compression. More specifically, it relates to a foveated imaging system which can be implemented on a general purpose computer and which greatly reduces image transmission bandwidth requirements.

1.2. DESCRIPTION OF THE RELATED ART

The human visual system provides detailed information only at the point of gaze, coding progressively less information farther from this point. This provides an efficient means for the visual system to perform its task with limited resources. Processing power is thus devoted to the area of interest and fewer neurons are required in the eye. Remarkably, we rarely notice the severely degraded resolution of our peripheral visual field; rather, we perceive the world as a single high resolution image that can be explored by moving our eyes to regions of interest. Imaging systems utilizing this fact, termed foveation, greatly reduce the amount of information required to transmit an image and therefore can be very useful for a number of applications including telemedicine, remote control of vehicles, teleconferencing, fast visual data base inspection, and transmission of pre-recorded video.

Recently, there has been substantial interest in such foveated displays. The U.S. Department of Defense has studied and used so-called "area-of-interest" (AOI) displays in flight simulators. These foveation schemes typically consist of only 2 or 3 resolution areas (rather than the superior continuous resolution degradation) and the central area of high resolution is often quite large, usually between 18° and 40° (see, for example, Howard, 1989; Warner, et al., 1993). Other researchers have investigated continuous, variable-resolution methods using a log polar pixel configuration (Weiman, 1990; Juday and Fisher, 1989; Benderson et al., 1992). The log polar configurations are particularly advantageous when rotation and zoom invariance are required, but their implementations have necessitated special purpose hardware for real-time operation.

Juday and Sampsell (U.S. Pat. No. 5,067,019) describe an apparatus which will encode a number of space-variant schemes. Fisher later refined the apparatus (U.S. Pat. No. 5,208,872). While otherwise effective, these systems are limited in that a specific hardware apparatus is necessary to perform the foveation operations. Further, these systems have utilized an Archimedes spiral to represent the falloff function applied to the image in their descriptions of the foveation method. While this may be computationally efficient for their specific hardware implementation, it does not as accurately represent the actual resolution falloff parameters of the human visual system, and does not provide the degree of flexibility in controlling the resolution function as the methods proposed here. Optimal compression and image quality are obtained by closely representing the actual resolution falloff parameters of the human visual system. The system of Weimans (U.S. Pat. No. 5,103,306), is more closely related to the apparatus described herein. However, implementation of the Weimans system requires specific hardware, and the foveation occurs in log polar coordinates, rather than Cartesian coordinates. Further, the algorithms employed during the compression and reconstruction of the foveated image create "cartoon-like" images (page 6, line 52, U.S. Pat. No. 5,103,306). Wallace, Benderson and Schwartz have also done work in the area of space-variant image processing (U.S. Pat. No. 5,175,617). They too, used a long polar mapping scheme, but because of the algorithms they utilized to perform the compression, the transmission rates were restricted to 4 frames per second, well below the rates required for near perceptually loss-less encoding.

2.0. SUMMARY OF THE INVENTION

The present invention overcomes the limitations in the prior art by providing a system that accomplished real-time foveated image compression and display, using general purpose computer processors, video hardware, and eye-tracking equipment. The foveated imaging system proposed here generates images that are nearly imperceptible from uncompressed images to the human observer. Further, the present invention makes use of a novel application of modified pyramid coding methods for creating foveated images. These coding methods provide higher quality images, at high compression rates, with little or no blocking or aliasing artifacts. The system can utilize one or more computer processors; the number of processors used depends upon the particular application and image-processing requirements.

2.1. Two-Processor FIS With Eye Tracking

In the inventors' Foveated Imaging System (FIS), eye movements are recorded in real time and are used to construct and display variable resolution images centered at the current point of gaze (fixation point). Typical operation of an exemplar FIS 10 proceeds as follows with reference to FIG. 1 for components and FIG. 2 for processes. First, the location of an observer 11 fixation point 12 on a display monitor 14 is measured with an eye tracking device 16 as depicted in process block 30 of FIG. 2. Second, the eye position coordinates are transmitted to a remote computer 18 as depicted in process block 32. Third, as represented by process block 34 of FIG. 2, remote computer 18 captures an image from camera 20. Fourth, the camera image is foveated (i.e., encoded and compressed so that the resolution of the image decreases from the point of fixation) as shown in process block 36. In other words, the degree of data compression increases with the distance from the point of fixation. Fifth, the encoded image is transmitted by communications channel 21 to a local computer 22 as shown in process block 38. Sixth, as depicted by process block 40, the received image is decoded and displayed on video monitor 14 such that the highest resolution region in the displayed image is centered at the fixation point 12. These six steps are repeated continuously in a closed loop. The system has been implemented in C++ for execution on standard PC compatible processors, including Intel Pentium® and Pentium® Pro, but other general purpose processors could also be used.

FIS 10 can operate in any one of several different modes. The different modes correspond primarily to different methods of foveated image encoding and decoding. Mode 1 is the simplest and quickest, and hence is most appropriate for large images and/or high video frame rates. Mode 2 produces substantially better data compression, for the same image quality, but is somewhat slower. Mode 3 produces the greatest data compression, but is even slower, and hence is most appropriate for smaller image sizes and/or low frame rates. Mode 4 is also slower and produces somewhat poorer image quality than Modes 2 and 3; it is included because of its wide-spread use. As general-purpose processors become more powerful, there will be an increasing number of situations where the high compression modes will be appropriate.

Mode 1: Foveated Pixel Averaging

In Mode 1, variable size pixels (SuperPixels) are created by simple averaging (Kortum and Geisler, 1996). The sizes of the SuperPixels increase smoothly away from the point of fixation in a manner that matches the decline in resolution of the human visual system away from the point of fixation. The color of each SuperPixel is obtained by averaging the RGB (or gray level) values of the image pixels that fall within the boundary defined by the edges of the SuperPixel. The collection of integration boundaries defined by the edges of the SuperPixel is called the ResolutionGrid.

FIG. 3 illustrates one of the ResolutionGrids used in the system. ResolutionGrid 50 consists of a series of concentric rings of SuperPixels that increase in size away from the point of fixation, $x_0$, $y_0$. Because each of the SuperPixels is rectangular, SuperPixels can be represented with two pairs of coordinates (which define the summation bounds). This allows fast implementation of operations such as summation, clipping, and calculation of ResolutionGrid 50.

The size of the SuperPixels in the $i^{th}$ ring represented in FIG. 3 by reference character 52, is calculated according to the formula, $$W_i = W_o \left(1 + \frac{\sqrt{(x_i - x_o)^2 + (y_i - y_o)^2}}{e_2}\right) \quad (1)$$

wherein $W_i$ is the size (in screen pixels) of the SuperPixels in ring 52, $W_0$ is the size of the central foveal SuperPixel 54 (in screen pixels), $x_0$, $y_0$ are the coordinates of the fixation point 56 (in degrees of visual angle), $x_i$, $y_i$ are the coordinates of the nearest SuperPixel 58 in ring 52 (the $i_{th}$ ring) (in degrees of visual angle), and $e_2$ is the half-resolution constant (in degrees of visual angle). This formula is based on available perceptual data, and is also consistent with anatomical measurements in the human retina and visual cortex (Wilson et al., 1990; Geisler and Banks, 1995; Wassle et al., 1992). For example, when $e_2$ is 2.5, the size of SuperPixel 54 is approximately proportional to the human resolution limit at each eccentricity. Thus, if $W_0$ is less than or equal to the foveal resolution limit then the foveated image should be indistinguishable from the original image (with proper fixation). If $W_0$ is greater than the foveal resolution limit, then the foveated image should be distinguishable from the original image. However, because $W_0$ is a proportionality constant in equation (1), the SuperPixel size will be above the resolution limit by a constant factor at all eccentricities. This should distribute any visible foveation artifacts uniformly across the display. Increasing $e_2$ increases the degree of foveation and hence the amount of compression.

Once ResolutionGrid 50 has been computed, a SuperPixel averaging subroutine averages the colors of each of the screen pixels that fall within each SuperPixel boundary, and assigns the resulting average value to that SuperPixel. SuperPixels at the edge of the display, and at the corners of the rings, are either clipped or merged in order to exactly cover the input image. SuperPixels of width 1 are excluded from the averaging subroutine.

Once the SuperPixels have been calculated, conventional secondary image compression algorithms are applied prior to transmission, decoding, and displaying. An example of a foveated image, without secondary compression is shown in FIG. 4. FIG. 4. is a 1024×1024 foveated image (Mode 1) with fixation at point 59 on the license plate of the Honda CRX. Because the pixel size is below the resolution limit of the visual system (for this size image), the resulting degradations due to foveation are imperceptible with appropriate fixation. The blockiness of the tree provides verification that this is a foveated image.

Mode 2: Foveated Laplacian Pyramid

Modes 2 and 3 make use of pyramid coding/decoding methods. Pyramid methods are widely used in non-foveated image compression (Burt & Adelson, 1983; Adelson, Simoncelli & Hingorani, 1987; Shapiro, 1993; Strang & Nguyen, 1996; Said & Pearlman, 1996). One new contribution of the Inventors' FIS is the modification of pyramid algorithms to include foveated image compression. Another contribution is the discovery that foveation not only increases the amount of image compression obtainable with pyramid methods, but substantially increases the speed of pyramid calculations. This makes foveated pyramid methods more feasible for real time video compression than non-foveated pyramid methods.

In Mode 2, a modified Laplacian pyramid algorithm (Burt & Adelson, 1983) is utilized. A simple example of the Foveated Laplacian Pyramid (FLP) algorithm is illustrated in FIG. 5. The pixels of an input image 60 are represented by the large grid in the upper left corner of FIG. 5. The coding steps are as follows for each level of the pyramid as shown in FIG. 5.

REDUCE. First, starting image 60 is filtered by convolution with a linear weighing function (kernal), and then down-sampled by a factor of 2 in each dimension, to obtain a smaller, lower-resolution image 62. In FIG. 5, the filter kernal is a 2×2 block, each element having a weight of ¼; thus, this REDUCE operation is equivalent to computing 2×2 SuperPixels over the entire image (as in Mode 1). For example, $b_{11}$ is the average of all, $a_{12}$, and $a_{22}$. Other kernals may also be used as later described in section 4.2.

EXPAND. Next, down-sampled (reduced) image 62 is interpolated (up-sampled) to obtain a larger, lower-resolution image 64. A great computational benefit of foveation is that it is usually only necessary to perform this EXPAND operation on a subset of the elements in the reduced image; i.e., on those elements within some distance of the fixation point, $x_0$, $y_0$. The elements over which the EXPAND operation is applied is determined from formulae derived from human perceptual data (see later) and from the current fixation position. Importantly, the percentage of elements over which the EXPAND operation needs to be applied is smallest for the largest reduced images (see later section 4.2).

DIFFERENCE. Next, expanded image 64 is subtracted from the starting image 60 to obtain a difference image 66. Again, there are computational savings over non-foveated pyramid methods since the DIFFERENCE operation is only applied to the image region that was expanded.

THRESHOLD. As indicated below, difference image 66 is thresholded, based upon formulae derived from human perceptual data (see 4.2). In the FIS, the threshold is a function of both the spatial frequency passband for the current pyramid level, and the distance to the fixation point.

It is at this step that much of the image compression due to foveation is obtained. Again, there are also computational savings over non-foveated pyramid methods since the THRESHOLD operation is only applied to the image region that was expanded.

QUANTIZE. Next, the thresholded image is quantized to obtain additional data compression. Quantization is a form of lossy compression where the number of colors (or gray levels) used to represent image elements is reduced. In the FIS, the level of quantization is a function of both the spatial frequency passband for the current pyramid level, and the distance to the fixation point. In this step, further image compression due to foveation is obtained. Again, there are also computational savings over non-foveated pyramid methods since the QUANTIZE operation is only applied to the image region that was expanded.

LOSSLESS COMPRESSION. The final step in the coding process is standard lossless compression (e.g., Huffman or arithmetic coding, image differencing across frames). Again, there are also computational savings over non-foveated pyramid methods since LOSSLESS COMPRESSION is only applied to the image region that was expanded.

As shown in FIG. 5, all of the above operations are repeated for as many levels of the pyramid as desired. In the current FIS, all of the REDUCE operations are performed first. Computation of the thresholded, quantized and lossless-compressed difference images then begins with a smallest (lowest resolution) reduced image and proceeds toward the largest (highest resolution) reduced image.

TRANSMISSION. All of the coded difference images, and the final reduced image are transmitted to the local computer 22 (see FIGS. 1 & 2), beginning with the final reduced image, and working backwards to the level-1 difference image. Each coded difference image is transmitted as soon as it is computed.

DECODING. Following transmission, the image data is decoded and displayed. The decoding proceedings in the reverse order of the coding. (1) Reverse the lossless compression. (2) Expand the quantize and thresholded data levels to the appropriate range. (3) Decode the pyramid to create the final transmitted image. During coding, it is only necessary to EXPAND those elements within some distance of the fixation point, $x_0, y_0$. However, for decoding it is necessary to apply EXPAND all of the elements at each level.

Mode 3: Foveated Wavelet Pyramid

Mode 3 utilizes a modified subband wavelet pyramid in place of the modified Laplacian pyramid. The processing steps in the Foveated Wavelet Pyramid are very similar to those of the Foveated Laplacian Pyramid; thus only the differences are described.

ANALYZE. In the wavelet pyramid the REDUCE, EXPAND and DIFFERENCE operations at each level of the coding pyramid are replaced by an ANALYZE operation which involves convolution with two or more linear kernals followed by downsampling. The most common 2D wavelet pyramids are based upon convolution with a low pass kernal, $l(x)$, and a high pass kernal $h(x)$, followed by downsampling by a factor of 2 in each dimension (as in the Laplacian pyramid). The result, at each level of the pyramid, is four subband images: LL (low pass in both directions), HL (high pass in the x direction and low pass in the y direction), LH (low pass in the x direction and high pass in the y direction) and HH (high pass in both directions).

$$LL = l(x)*(l(y)*i(x,y)) \cdot samp\downarrow(x,y) \quad (2)$$

$$HL = h(x)*(l(y)*i(x,y)) \cdot samp\downarrow(x,y) \quad (3)$$

$$LH = l(x)*(h(y)*i(x,y)) \cdot samp\downarrow(x,y) \quad (4)$$

$$HH = h(x)*(h(y)*i(x,y)) \cdot samp\downarrow(x,y) \quad (5)$$

wherein $i(x,y)$ represents the input image (or subimage), $samp\downarrow(x,y)$ represents the sampling function (which sometimes must be different for each of the four equations), and * represents the operation of filtering (convolution). These four subimages together contain exactly the total number of elements in the input image.

The three high-pass subimages (HL, LH, HH) play the role of the difference image in the Laplacian pyramid. To them are applied the THRESHOLD, QUANTIZE and LOSSLESS COMPRESSION operations, prior to transmission. The strictly low-pass subimage (LL) plays the role of the reduced image in the Laplacian pyramid, it is used as the input image to the next level of the pyramid (e.g., it is processed by equations 2–5). The subimages for the first two levels of a wavelet pyramid are illustrated in FIG. 6.

The elements over which the high-pass convolutions are applied are determined from formulae derived human perceptual data (see later) and from the current fixation position. Because of the resolution properties of the human visual system, the percentage of elements over which the high-pass convolutions need to be applied is smallest for the largest subimages. This computational savings greatly increases the speed of the wavelet pyramid calculations, since only for the LL image (equation 2) must all the elements be processed.

SYNTHESIZE. Following transmission and initial decoding (undoing the LOSSLESS COMPRESSION, THRESHOLD and QUANTIZE operations) the subband images are synthesized into the final image which is then displayed. The SYNTHESIZE operation is similar to the final EXPAND and ADD operations of the Foveated Laplacian Pyramid. Specifically, the highest-level subimages are upsampled, filtered by a pair of low-pass and high-pass synthesis kernals and then added together. The resulting image and the subimages at the next level are then upsampled, filtered by a pair of low-pass and high-pass synthesis kernals and then added together. This process repeats until the full image is synthesized.

There are many possible choices for the low and high-pass kernals. Examples, are the 9-tap QMF filters of Adelson, Simoncelli & Hingorani (1987) or the 9/7-tap filters of Antonini, Barlaud & Daubechies (1992).

Mode 4: Foveated Block DCT

Mode 4 utilizes standard block DCT (Discrete Cosine Transform) coding/decoding rather than pixel averaging or pyramid coding. In block DCT the image is divided into non-overlapping blocks; a discrete cosine transform is then applied to each block (Stang and Nguyen, 1996). For example, in the JPEG standard the block sizes are 8×8 pixels. In Foveated Block DCT, the DCT coefficients are thresholded, quantized, lossless coded and transmitted in a fashion similar to that for the Foveated Pyramids. The DCT coefficients that need to be computed are determined from formulae derived from human perceptual data (see later) and from the current fixation position. Because of the resolution properties of the human visual system, the number of coefficients that needs to be computed decreases drastically away from the point of fixation. This computational savings greatly increases the speed of block DCT coding and decoding.

2.2. Eye Position Tracking

After initialization of parameters (and eye tracker calibration, if necessary), the system enters a loop in which the position of the eye is measured (see block 30 of FIG. 2). The measurement of eye position is done with a commercial eye tracking device 16. The current system uses a Forward Technologies Dual Purkinje Eyetracker, but almost any commercially available eye tracker would do. Eye position is measured and transmitted to the remote processor at approximately the frame rate of the display monitor. In Mode 1, the eye position is used to compute a new ResolutionGrid 50 centered on the point of fixation. In Modes 2 and 3, the eye position is used to set the region over which image elements are processed, and to set the threshold and quantization functions (see later).

Because of noise in the eye tracker and because of small fluctuations in eye position, it is usually desirable not to change the fixation point $(x_0, y_0)$ used in the coding algorithm unless the change in measured eye position exceeds a threshold (e.g., 0.5 deg of visual angle). The rule used in the current system is:

$$\text{if } \sqrt{(x_0-x_m)^2+(y_0-y_m)^2} < \delta \text{ then leave } (x_0,y_0) \text{ unchanged, otherwise set } (x_0,y_0) \text{ equal to } (x_m,y_m) \quad (6)$$

where $(x_m, y_m)$ is the current measured eye position and $\delta$ is a threshold.

2.3 Four-Processor FIS with Eye Tracking

The process of foveation greatly reduces the amount of image data that needs further processing, and thus makes possible simple, inexpensive parallel pipeline architectures such as that in FIG. 7. The four processor system 70 illustrated in FIG. 7 consists of two remote processors 72 and 74 (e.g., two Pentium® computers) and two local processors 76 and 78. One of the remote processors 72 performs the initial foveation coding, while the other processor 74 performs the additional lossy and lossless compression, plus the transmission over the main communication line 21 to the local processors 76 and 78. One of the local processors 76 receives the remote data and performs the initial decoding into foveated image data, while the other processor 78 expands and displays the foveated image data. Because of the substantial data compression due to the foveation stage, simple, inexpensive, low bandwidth communication channels (see later) 80A and 80B are all that is needed between the two remote computers and between the two local computers. This system is capable of real time operation with larger image sizes and/or higher frame rates than the two-processor system 10. The only specialized piece of hardware required is a simple parallel communication card (or communications card of equivalent speed) in each computer.

This system 70 is particularly well adapted for Modes 2 and 3. As each difference image, or subband image, is computed in first the remote computer, it is transmitted to the other remote computer for thresholding, quantization, lossless coding and transmission. Similarly, as each difference or subband image is decoded by the first local computer, it is transmitted to the other local computer for expansion/synthesis and display.

2.4 FIS Without Eye Tracking

In general, foveated images appear low in quality unless fixation is at the proper position. Thus, for most imaging applications, eye tracking is an essential component of a useful foveated imaging system. There are, however, two exceptions.

One exception is when a mouse or some other pointing device can be used in place of the eyes. This is a simple modification of the system where the screen coordinates from the alternate pointing device are transmitted to the remote computer rather than the screen coordinates from the eye tracker. In all other respects, the system would be the same as described earlier. Alternate pointing devices could be useful in situations where eye tracking would be impossible or too expensive, yet not absolutely essential. Some examples would be surveillance systems or systems for inspecting/searching large data bases of images (e.g., satellite imagery). In these applications, pointing-device control of foveation might be adequate. In some cases, the remote control of vehicles, foot controls, touch pads, or pointing sticks would be adequate for controlling the foveation point.

The other exception is the presentation of pre-recorded video. In static images, observers typically fixate on a large number of points within the image, making observer-controlled foveation essential. However, in dynamic video situations, observers tend to fixate at certain critical points within the images. Thus, it might be possible to transmit foveated images based upon the most likely point of fixation, without observer-controlled foveation. Unfortunately, there are no adequate algorithms or models for predicting where observers will fixate in dynamic (or static) video sequences. However, for prerecorded video (e.g., movies), it would be possible to simply measure, in prior testing, where observers fixate the unfoveated video sequence. In other words, an eye tracker would be used in pre-testing to measure the point (or points) of fixation in every frame of the video, for each test observer. The fixation patterns of the test observers would then be used to create a foveated version of the pre-recorded video, using algorithms similar to those described in this document. The foveated version of the pre-recorded video would be transmitted to the user. The most obvious application of this type of foveated imaging system would be in transmission of pre-recorded video for high-definition digital television (HDTV). In this application, where very high perceptual quality is required, the amount of foveation would presumably be kept relatively small. Nonetheless, even a factor of two in additional compression (from foveation) would be of great significance.

2.5 Key Design Features of the Foveated Imaging System

The present invention contains many key design features. First, it can be implemented with conventional computer, display, and camera hardware, insuring low cost and easy improvements to the system. Most, if not all, previous systems that operate at useful video frame rates involve special purpose hardware that is costly and quickly becomes obsolete.

Second, the system utilizes novel algorithms (Foveated Laplacian Pyramids, Foveated Wavelet Pyramids and Foveated Block DCT) for image coding and decoding. These algorithms produce very high compression rates with high perceptual image quality. They are superior both in degree of compression and in perceived image quality to previous foveated imaging algorithms. Furthermore, Foveated-Laplacian-Pyramid, Foveated-Wavelet-Pyramid and Foveated-Block-DCT algorithms produce greater compression, and have faster execution times, than the non-foveated versions of these algorithms. The present system (unlike previous foveated imaging systems) makes practical real-time use of these highly-desirable coding algorithms on conventional, inexpensive, computer hardware (e.g., Pentium® class PCs).

Third, the system is designed to be highly flexible and adaptable to different situations. The overall display resolution, as well as the coding algorithm (the mode), is adjustable to accommodate different communication channel bandwidths and different image-size/frame-rate requirements. In addition, variable resolution, quantization and thresholding parameters are adjustable by the user to optimize subjective appearance or task performance.

Fourth, the system utilizes novel methods of incorporating human perceptual properties into the coding and decoding algorithms. Specifically, the system combines known variations in human contrast sensitivity, as function of spatial frequency and retinal eccentricity, in order to closely match the image compression to the image-coding properties of the human visual system. A close match insures that maximum compression is achieved with optimal perceptual quality. No previous system uses both smooth foveation based upon the decline in spatial resolution with eccentricity, and thresholding/quantization based upon the variation in contrast sensitivity with spatial frequency. The system's default variable-resolution algorithms, based upon quantitative (psychophysical) measurements of the variations in human contrast sensitivity with eccentricity and spatial frequency, provide superior foveation.

Fifth, the simple parallel pipeline architecture described in 2.3 and 4.5 enhances the capability for conventional data compression in conjunction with foveated compression. The represents an inexpensive method of increasing the image sizes and/or frame rates, and the level of image compression that can be obtained.

Sixth, the use of a foveated imaging system with alternate pointing devices, and in the transmission of pre-recorded video (without eye tracking), are novel applications.

The list of potential applications for the invention include:
Teleconferencing (requires two foveated imaging systems)
Remote control of vehicles
Telemedicine
Surveillance
Fast visual data base inspection
Transmission of pre-recorded video

3.0 BRIEF DESCRIPTION OF THE DRAWINGS

Figure 11A:
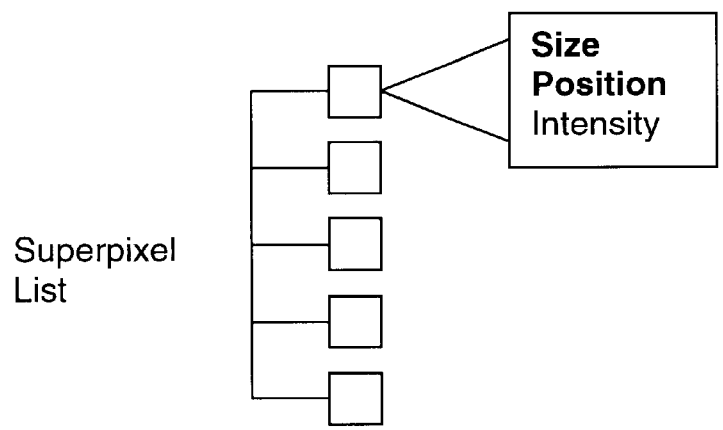

FIG. 11A graphically represents the process of creating the SuperPixel list in a preferred embodiment of the invention.

Figure 11B:
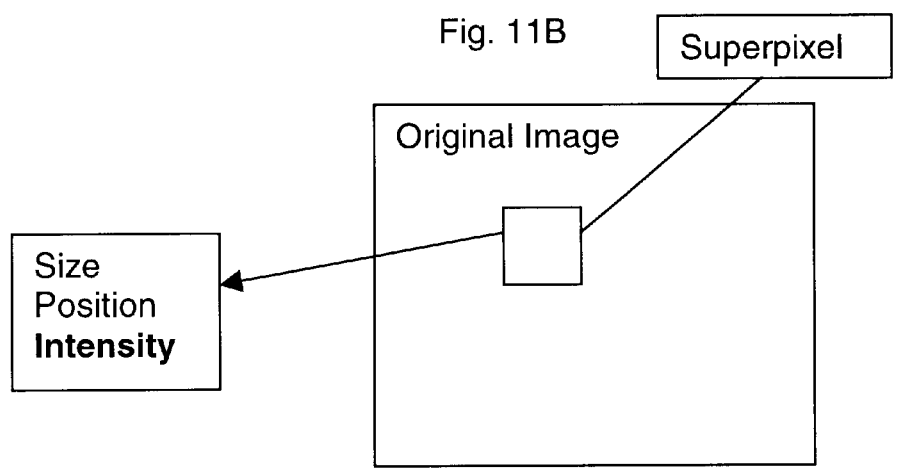

FIG. 11B graphically shows the process of averaging pixels from the input image.

Figure 11C:
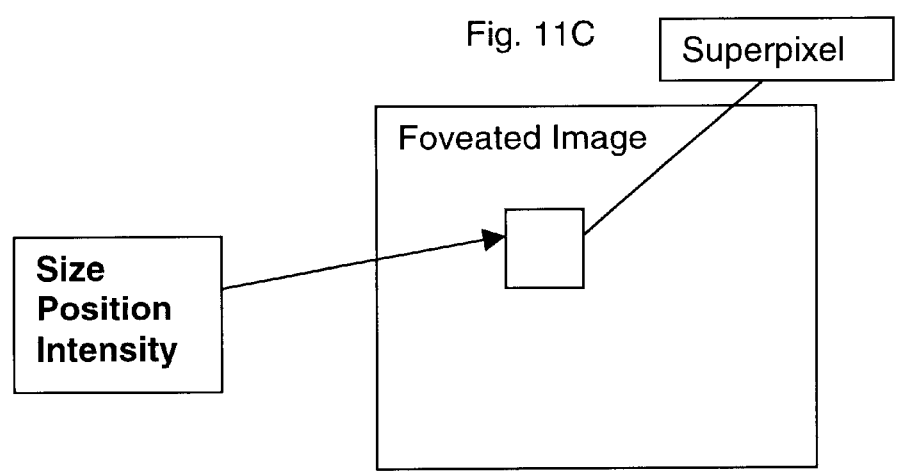

FIG. 11C graphically illustrates the process of display in a preferred embodiment.

Figure 12:
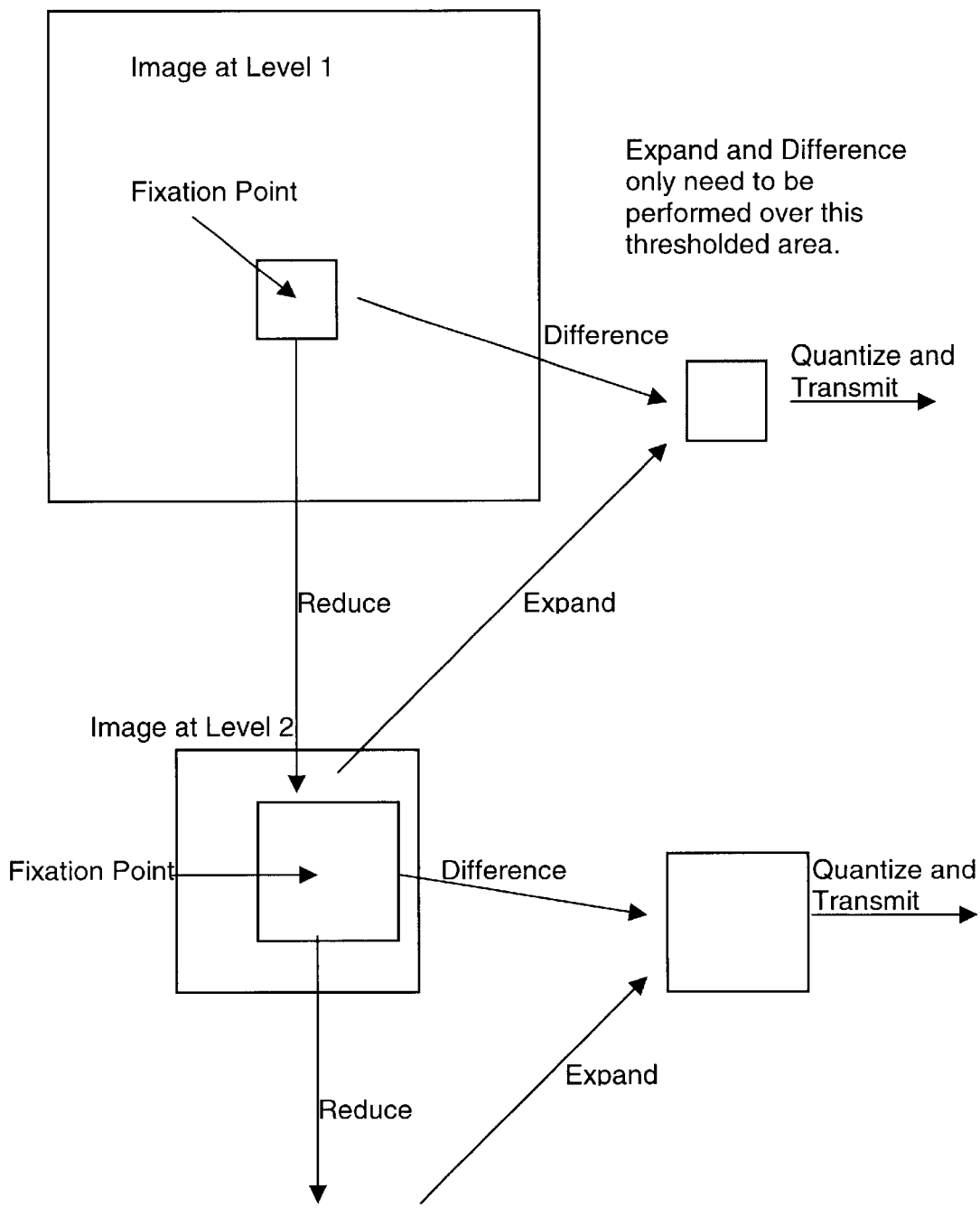

FIG. 12 depicts Foveated Laplacian Pyramid encoding.

Figure 13:
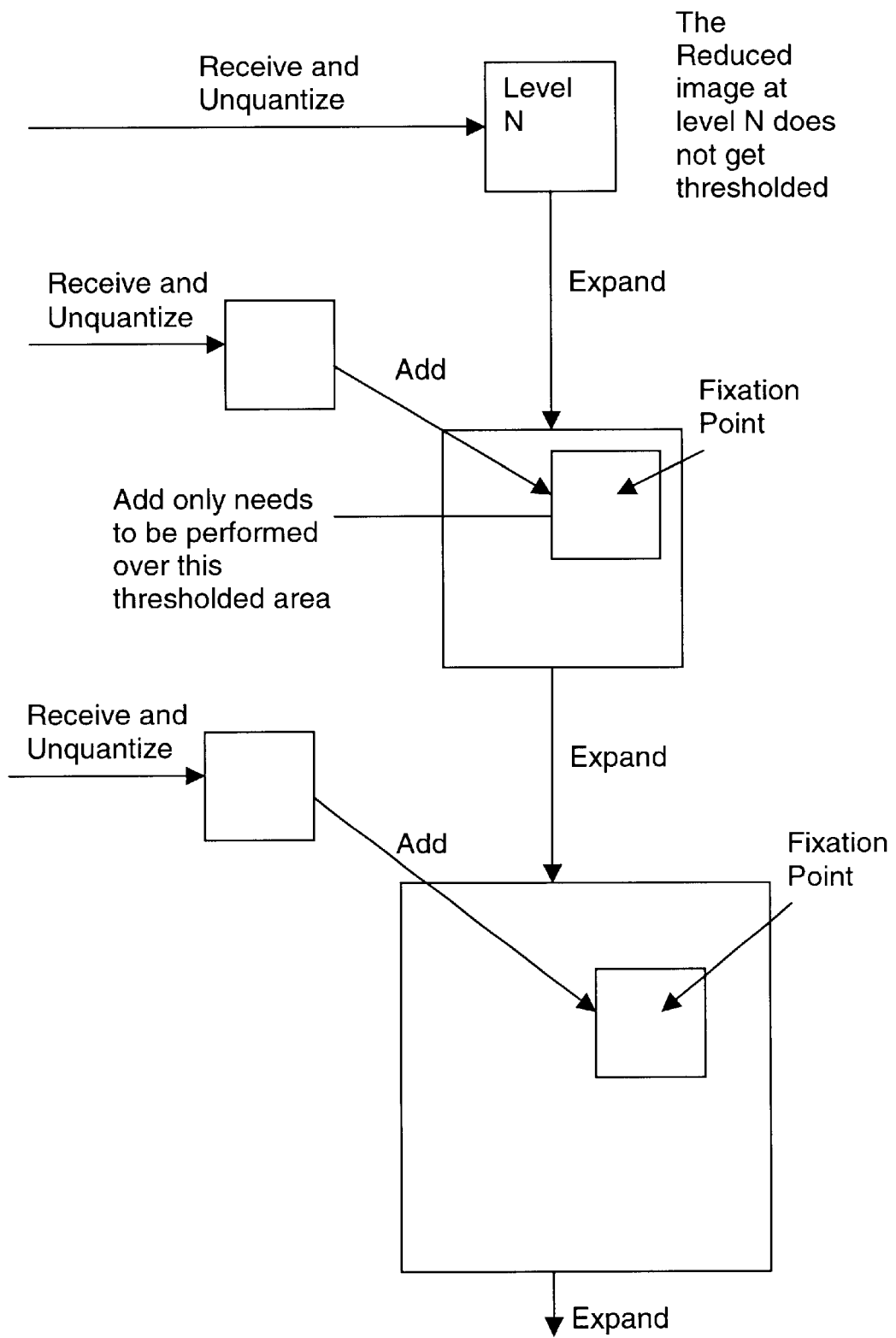

FIG. 13 is a diagram of Foveated Laplacian Pyramid decoding.

Figure 14:
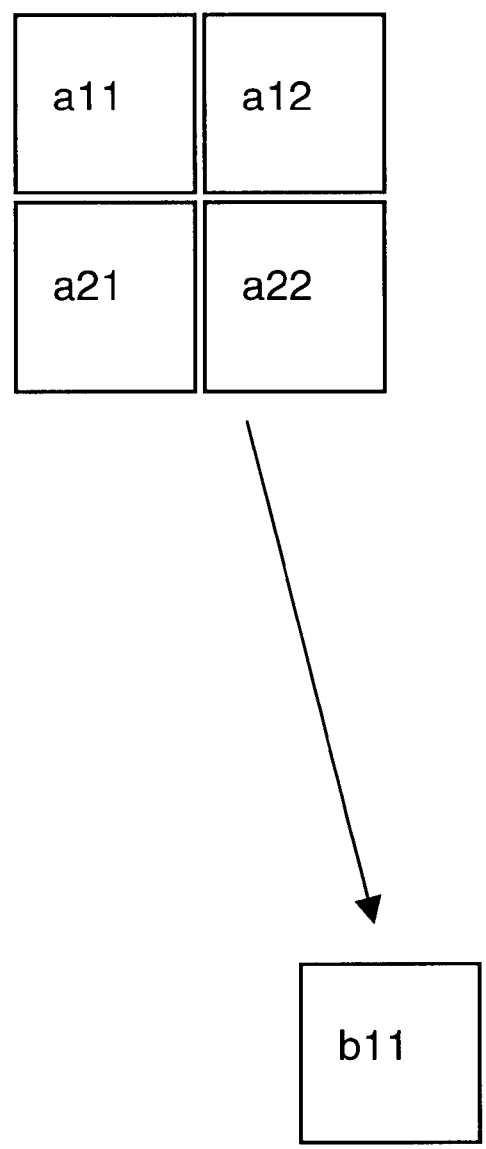

FIG. 14 depicts a 2×2 REDUCE operation.

Figure 15:
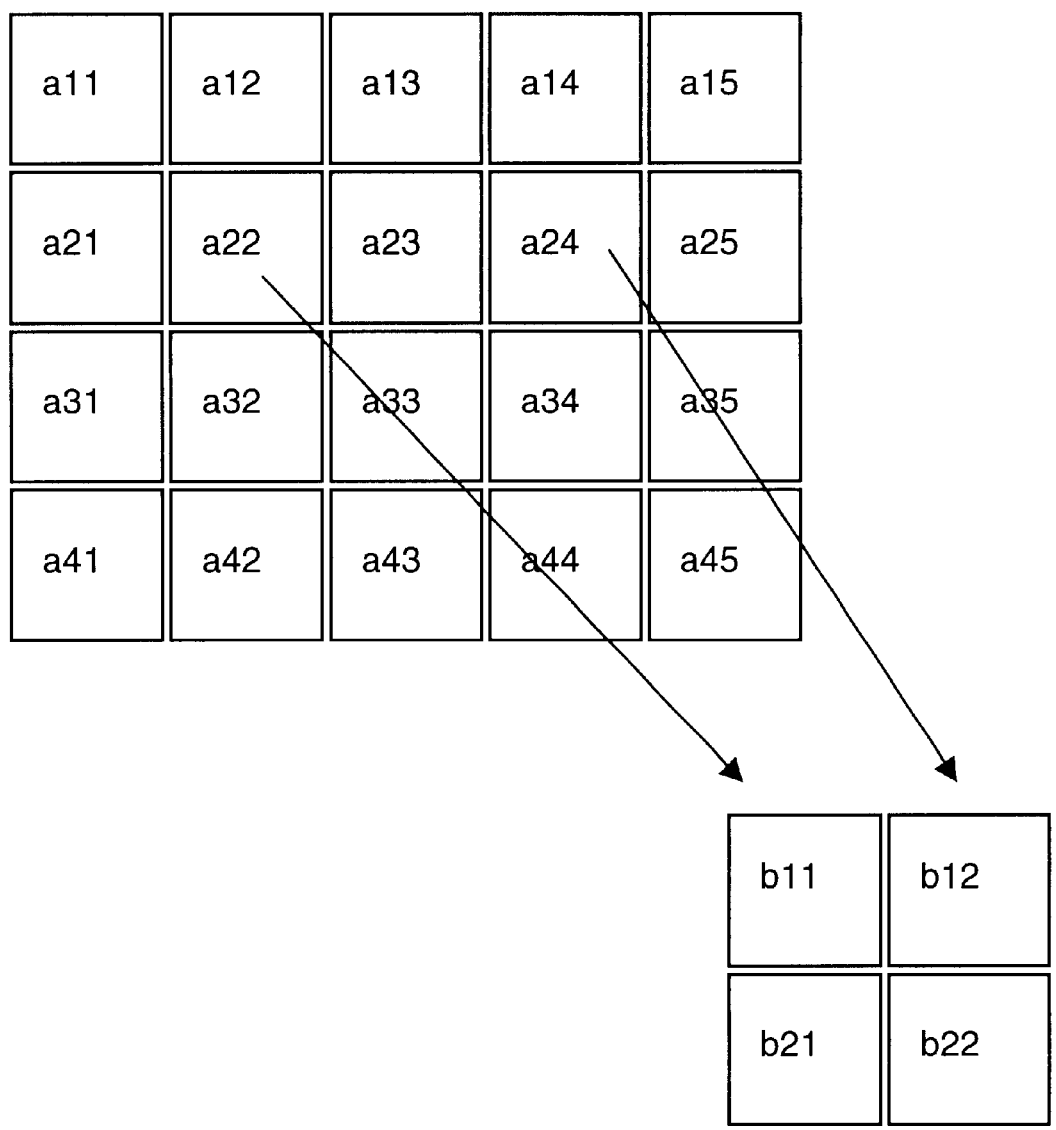

FIG. 15 depicts a 3×3 REDUCE operation.

Figure 16:
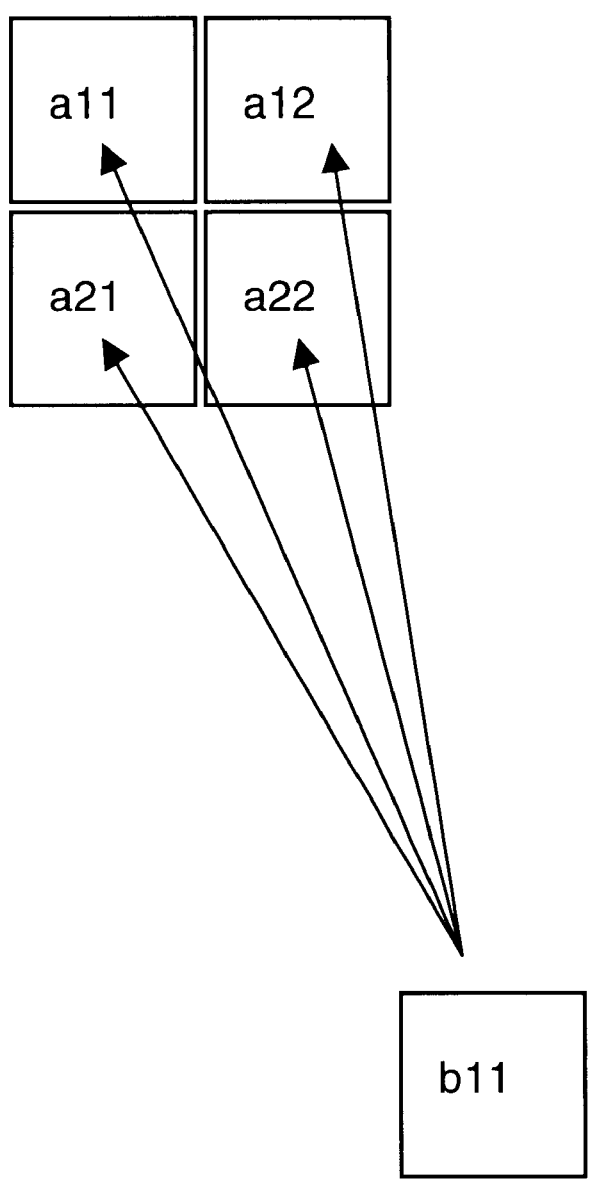

FIG. 16 depicts a 2×2 EXPAND operation.

FIG. 17 depicts a 3×3 EXPAND operation.

Figure 18:
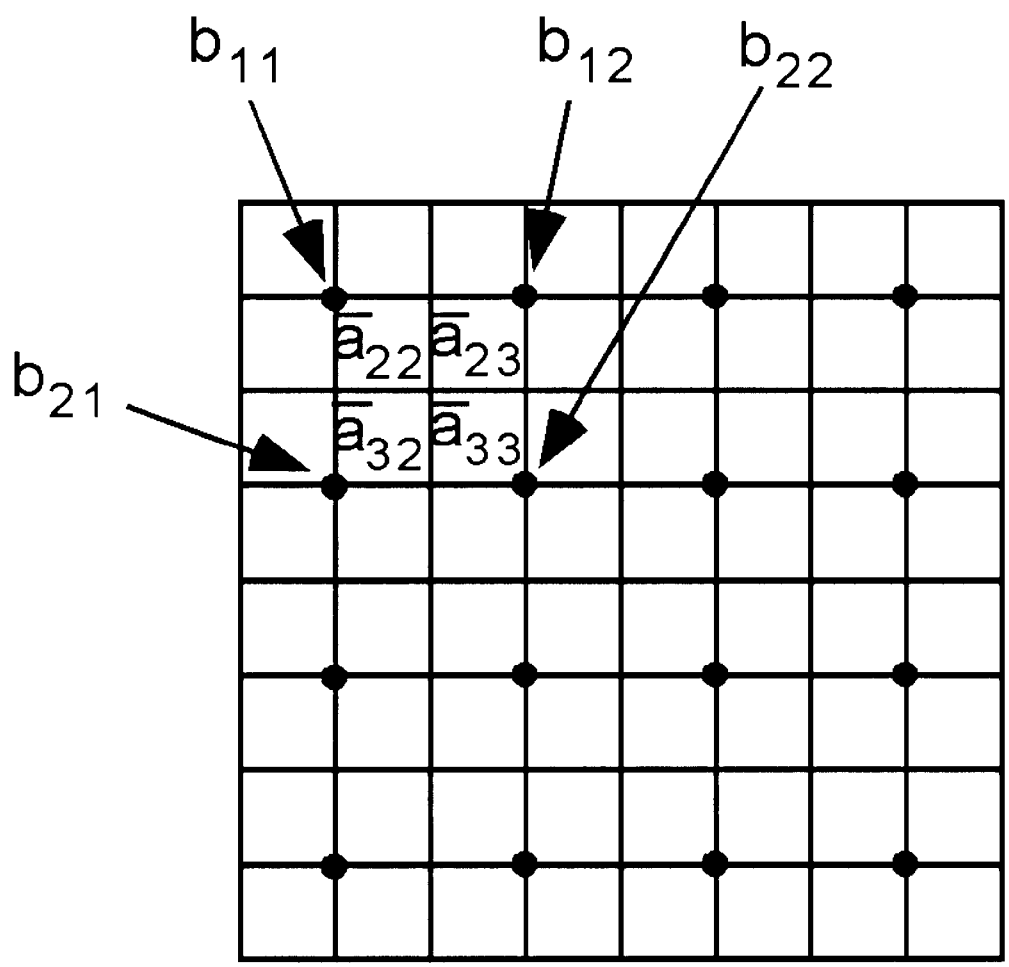

FIG. 18 further illustrates a 2×2 version of the EXPAND operation.

Figure 19:
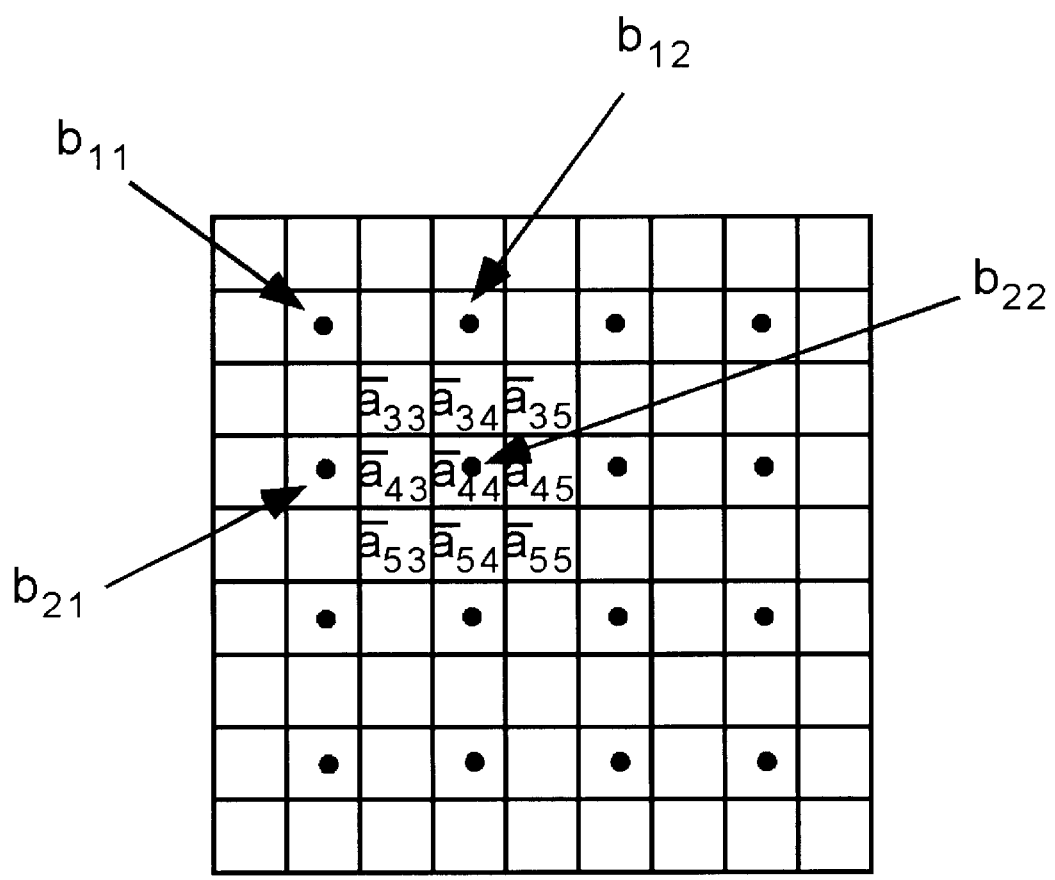

FIG. 19 further illustrates a 3×3 version of the EXPAND operation.

4.0 DESCRIPTION OF PREFERRED EMBODIMENTS

An important facet of the current invention is its ability to be run with conventional hardware, including computer, display, camera and eye-tracking equipment. In one embodiment of the invention, the computers may be any PC compatible Pentium® or Pentium® Pro with a PCI bus. Acceptable cameras include any NTSC (RS-170) camera (e.g., Sony XC-75) and many digital cameras (e.g. Dalsa CA-D2-512 digital camera, Dalsa, Waterloo, ONT, Canada). Conventional frame grabbers are also sufficient (e.g., MuTech MU-1000/MT-1300 (RS-170) or MU-1000/MV-1100 (digital), MuTech, Billerica, Mass.) as camera 20. Almost any commercially available eye-tracker 16 can be used in the system (e.g., Forward Technologies, San Marcos, Tex.; ISCAN Inc., Cambridge Mass.; Applied Science Laboratories, Bedford, Mass.; Express Eye, Renquishausen, Germany). To read the eye tracking signals, any A/D card (12 bits or better) and digital I/O card (8 bits or better), will suffice (e.g., Analogic HSDAS-16, Analogic, Wavefield, Mass.).

Figure 7:
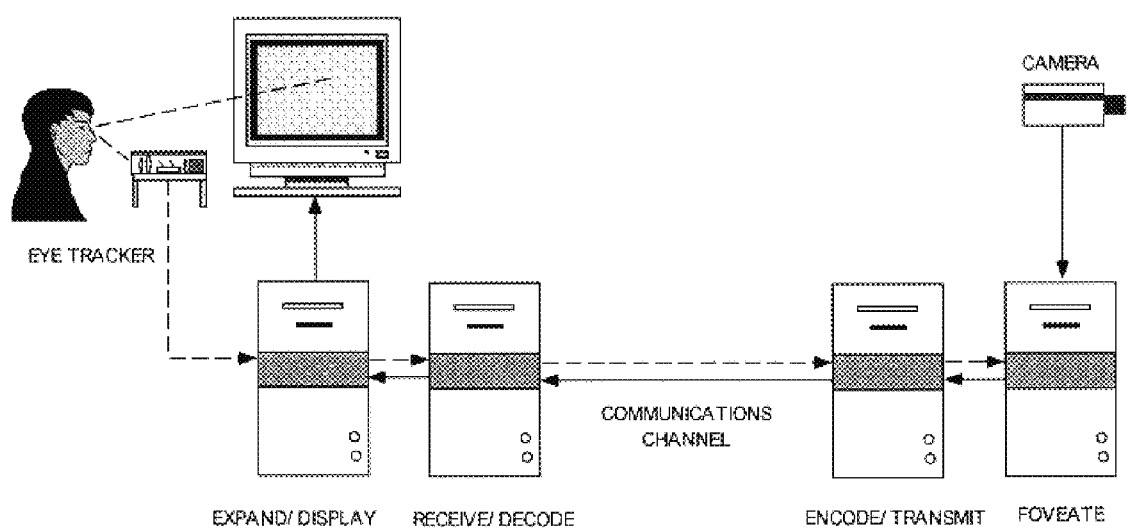
FIG. 7 depicts a preferred embodiment of a four-processor Foveated Imaging System.
Figure 8:
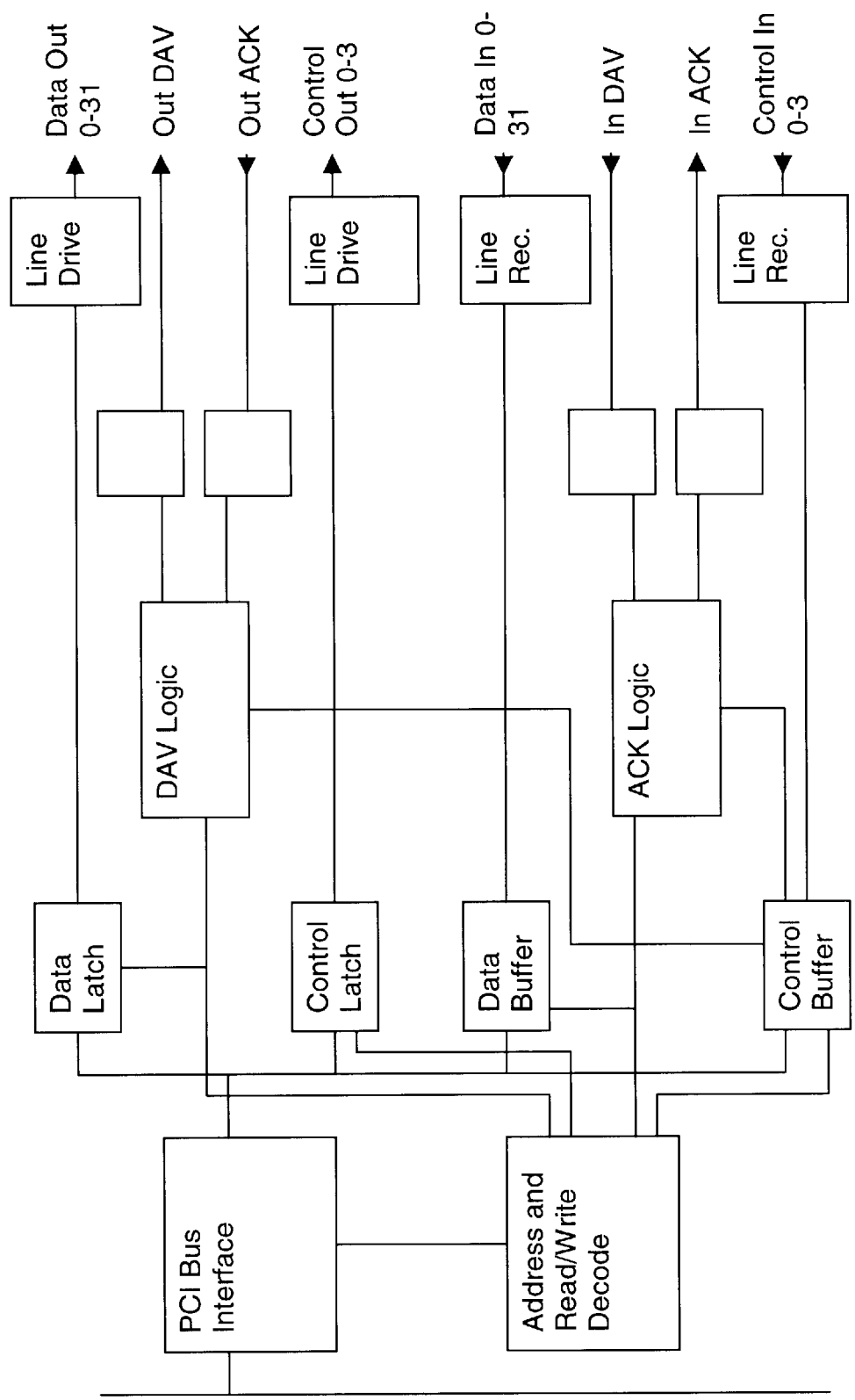
FIG. 8 is a block diagram of PCI bus local communications card.

The only more specialized hardware would be a simple local communication interface card (able to support a transfer rate of 3 mbytes/sec) needed with the Four-Processor FIS system 70 (see 2.2 and FIG. 7). This communication card is not required for the Two-Processor FIS system 10. A block diagram of one such card is shown in FIG. 16. The description of the blocks of FIG. 8 is as follows.

PCI Bus interface 100—Implements capabilities required to attach a device to PCI bus 102—including configuration registers, and a two quad-byte address space. The lower address represents the DATA in and out registers, the higher the CONTROL in and out registers. PCI Bus interface 100 also implements a 32 bit bidirectional data bus with a 1 bit address "bus" and read/write strobes for communicating with Data latches 104 and 105 and 3-state buffers 106.

Address and Read/Write decode logic 110—Turns the PCI Bus interface 100 address bus and read write strobes into separate, address specific read and write strobes (read control, write control).

Data and Control output latches 104 and 105 hold Data written by PCI Bus interface 100, and make it available to the line drivers 112A and 112B for transmission to the other computer.

Data-in buffers 114 and Control-in 3-state buffers 116 pass data from bus receivers 117A and 117B (and from the other computer) to PCI Bus interface 100 in response to read strobe signals from the PCI Bus interface 100 (through the Address and Read/Write decode logic).

DAV logic block 118, together with the ACK logic block of the other computer implement handshaking between computers. DAV Logic 118 generates a DATA AVAILABLE (DAV) signal to notify the receiving computer that data has been placed on the data out lines and should be read. The DATA AVAILABLE signal remains asserted until the receiving computer asserts the DATA ACKNOWLEDGE (ACK) signal line, signifying that the transmitted data has been read. The DAV signal is also connected to Control-In 3-state buffers 116 to allow the program controlling the transmission of data to determine when a previously transmitted data has been safely received.

ACK Logic 120 implements the receiving end of the DAV/ACK handshaking. Receipt of a DAV signal notifies the controlling program, through the Control-In section, that data is available and must be read. When the controlling program reads the Data-In register, ACK Logic 120 asserts the ACK signal. When the other computer sees the ACK signal, it deasserts it's DAV signal, which causes ACK logic to de-assert its ACK signal. The system is then ready for the next transmission.

Line drivers and receivers will depend on transmission distance requirements. For short distances and lower data rates, none will be needed. For longer distances and higher data rates, more sophisticated drivers and receivers can be used.

4.1 Foveated Pixel Averaging

Figure 9:
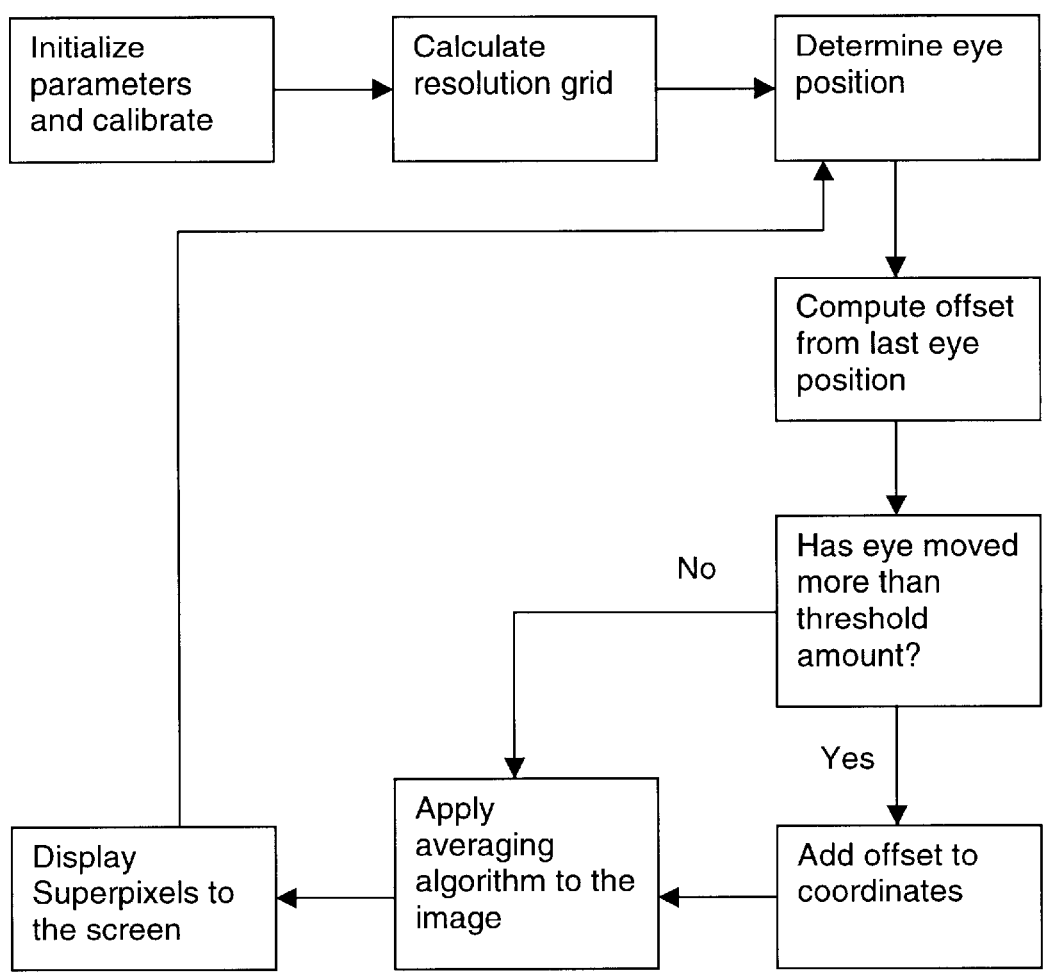
FIG. 9 is a general flow diagram for the C version of the Foveated Imaging System operating in Mode 1 (Foveated Pixel Averaging).

One version of the system, with Foveated Pixel Averaging, has been implemented in C (Portland Group PGCC) for execution on an ALACRON 1860 (Alacron Inc., Nashua, N.H.) processor, but better performance can be obtained on a Pentium® Pro processor. FIG. 9 illustrates the general function of the system. Upon system initialization depicted by block 200, the user is queried for a number of required parameters (pixel dimensions, image size, image distance, half resolution constant, eye movement update threshold, etc.). Using these parameters, a space variant arrangement of SuperPixels (referred to as the Resolution Grid) is then calculated and stored for display as shown by process block 202 (a SuperPixel is a collection of screen pixels that have been assigned the same gray level value). Next, an eye position calibration is conducted shown by process block 204. The system then enters a closed loop mode, in which the current eye position is determined and compared with the last known eye position as depicted in process block 206. If the eye has not moved more than some amount specified during initialization (decision block 208), then pixel averaging (based on the Resolution Grid) is executed as shown in block 210. However, if the eye has moved more than this threshold amount then the coordinates of the ResolutionGrid are offset by the magnitude of the eye movement before pixel averaging as depicted by process block 209. Finally, the resulting SuperPixels are sent to the display device as shown in block 212, and eye position is checked again.

Only the closed loop portion of the program is required to run in real time. Initialization, calibration and calculation of the space-variant resolution grid take place prior to image display. However, because of the simplicity of the resolution grid structure (which is described in greater detail below), it can also be re-calculated in real time, if desired.

The system has also been implemented in C++ (Watcom C/C++) for execution on an Intel Pentiums processor. This implementation works similarly to the C version: parameters are entered by the user and the system is initialized, and the system then enters a closed loop in which eye movement data is collected. Within the closed loop, the image is foveated and displayed based upon the movement of the eye.

One difference between the C implementation and the C++ implementation is that whenever the eye moves beyond the eye movement threshold, the C++ implementation recomputes the entire ResolutionGrid based upon the new eye position. In the C implementation, the ResolutionGrid must be 4 times greater than the image in order to facilitate offsetting the grid relative to the fixation point. Each SuperPixel in the ResolutionGrid must then be examined to determine whether or not it lies within the image boundary. The Superpixels that do not lie within the image boundary are then clipped. In the C++ implementation, since the Resolution Grid is recalculated with each eye movement (that exceeds the eye movement threshold), the grid needs only be as large as the image, and, therefore, no clipping is required. In these particular implementations, recomputing the ResolutionGrid and not clipping SuperPixels has shown a slight performance benefit over computing a single ResolutionGrid and offsetting it relative to the fixation point.

Figure 10:
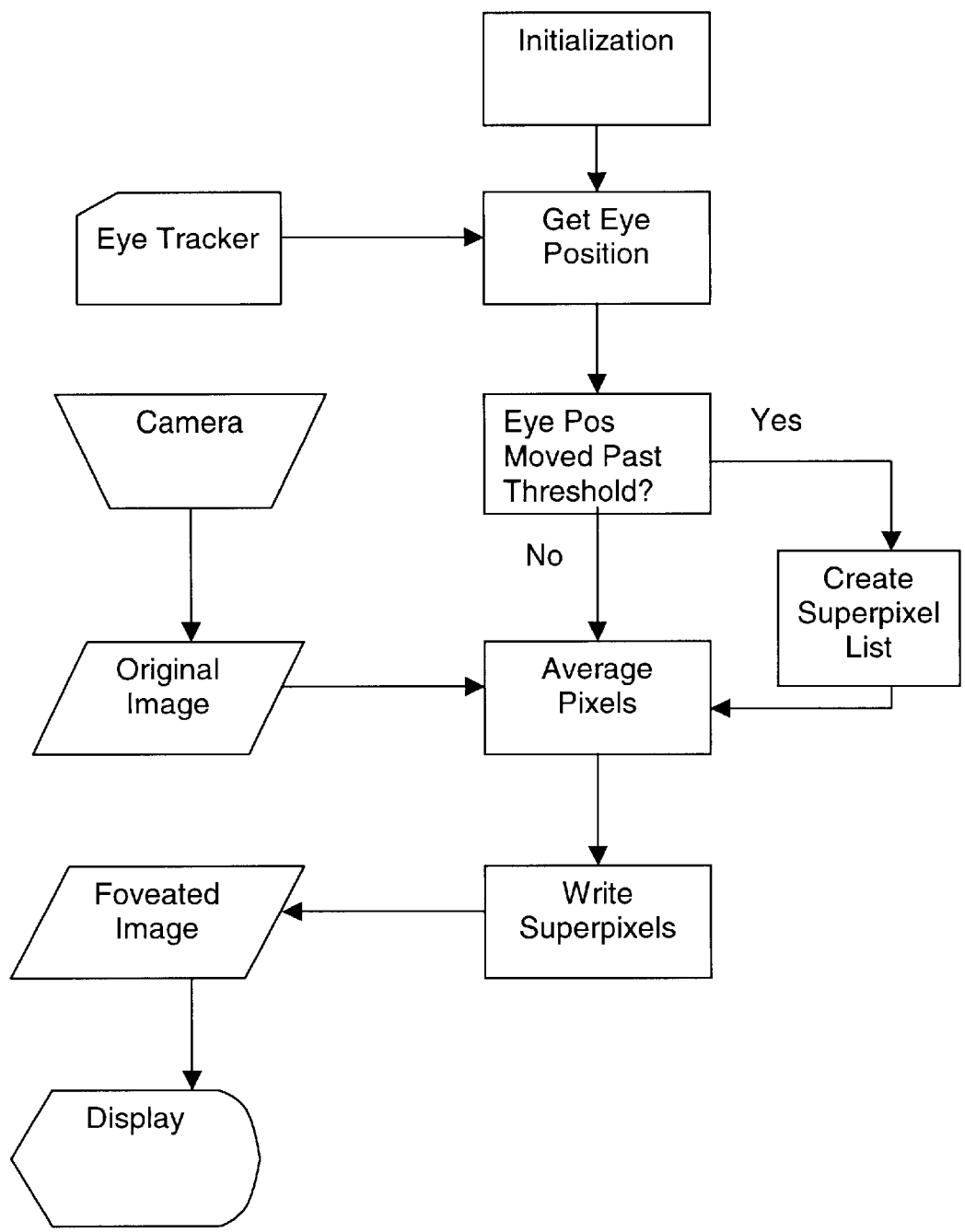
FIG. 10 is a general flow diagram for the $C^{++}$ version of the Foveated Imaging System operating in Mode 1 (Foveated Pixel Averaging).

FIG. 10 illustrates a flowchart description of Foveated Pixel Averaging and the processes of creating the Superpixel list, averaging pixels from the input image, and displaying them on the display are summarized in FIGS. 11A, 11B, and 11C, respectively.

Block 214 in the flow chart of FIG. 10, shows the initialization phase. During the initialization phase parameters are entered and set as described above.

After initialization, the current measured eye position $(x_m, y_m)$, is obtained as shown by blocks 215 and 216. The eye position's distance from the systems's fixation point, $(x_0 y_0)$, is then compared to a threshold, $\delta$ in decision block 218. If $\sqrt{(x_0-x_m)^2+(y_0-y_m)^2} < \delta$ then $(x_0, y_0)$ remains unchanged, and the "No" branch of the flowchart is taken. Otherwise $(x_0, y_0)$ is set equal to $(x_m, y_m)$, and the "Yes" branch of the flowchart is followed in order to create a new list of SuperPixels as depicted by block 220.

When a new list of SuperPixels is created, the system's fixation point and the parameters given during initialization are used to determine each SuperPixel's properties. Each SuperPixel in the list specifies a size and starting coordinate relative to the viewed image. The final list collectively describes a non-overlapping grid of pixel regions that cover the entire image. Creation of the SuperPixel list is graphically shown in FIG. 11A.

The next step in the process is to average pixels in the input image in order to get an average color or grey scale value for each SuperPixel as shown in block 222. Averaging of grey scale values is done by simply summing pixels over the superpixel's pixel region and dividing by the number of pixels in the superpixel. Averaging of unmapped, or true-color values is done the same as for grey scales, except the individual red, green, and blue intensities are each averaged. Averaging of color mapped images (images whose pixel values correspond to indices in a map of color values) is achieved by first converting each superpixel's RGB (tristimulus) components to YUV (color sum/difference) components. These YUV components are then averaged, and the resulting average YUV components are used to find the closest matching color value in the image's color map. The averaging process is graphically shown in FIG. 11B.

The final step is to write the Superpixels to the display in process block 224. The simplest way to do this is to write each pixel as a block whose pixels are all the same value as the Superpixel's averaged color or grey scale value. A better way is to interpolate pixel values in order to create a smooth image that does not contain block edges. In order to do this, each Superpixel's grey scale or color value is written to the display buffer in the center of that Superpixel's pixel region. Then, bilinear interpolation is used to smooth the image. Specifically, pixels are linearly interpolated in the vertical direction to create smooth color changes between all vertically adjacent superpixel centers. Pixels are then linearly interpolated in the horizontal direction to create smooth color changes between the vertically interpolated pixels. Constructing an image is graphically shown in FIG. 11C.

4.2 Foveated Laplacian Pyramid

The Foveated Laplacian Pyramid system has been implemented in $C^{++}$ (Watcom $C/C^{++}$) on an Intel Pentium® processor.

Foveated Laplacian Pyramids work similarly to Laplacian Pyramids, however, during the expand operation of the Foveated Laplacian Pyramid, only the region within the human contrast threshold needs to be Expanded and Differenced during the encoding process. This means that during the decoding process, only in this same region will differenced images need to be added back to obtain the original image. This is illustrated in FIG. 12 and FIG. 13.

Figure 1:
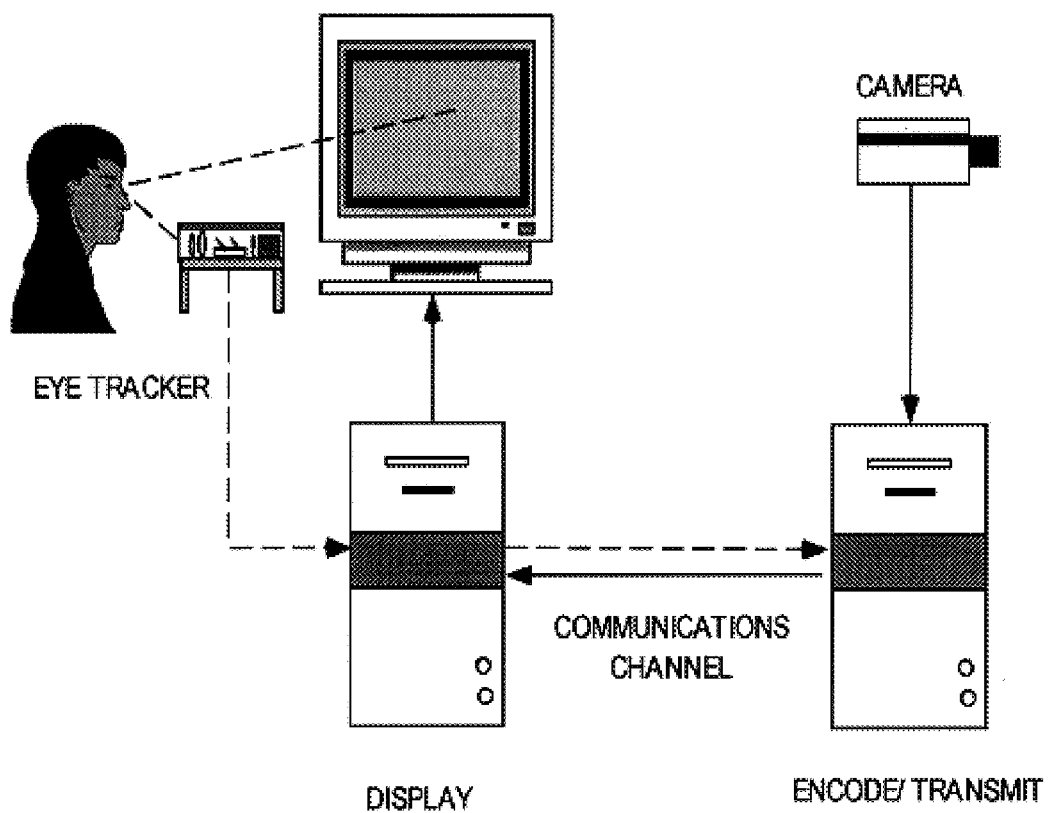
FIG. 1 depicts a preferred embodiment of a two-processor Foveated Imaging System.
Figure 2:
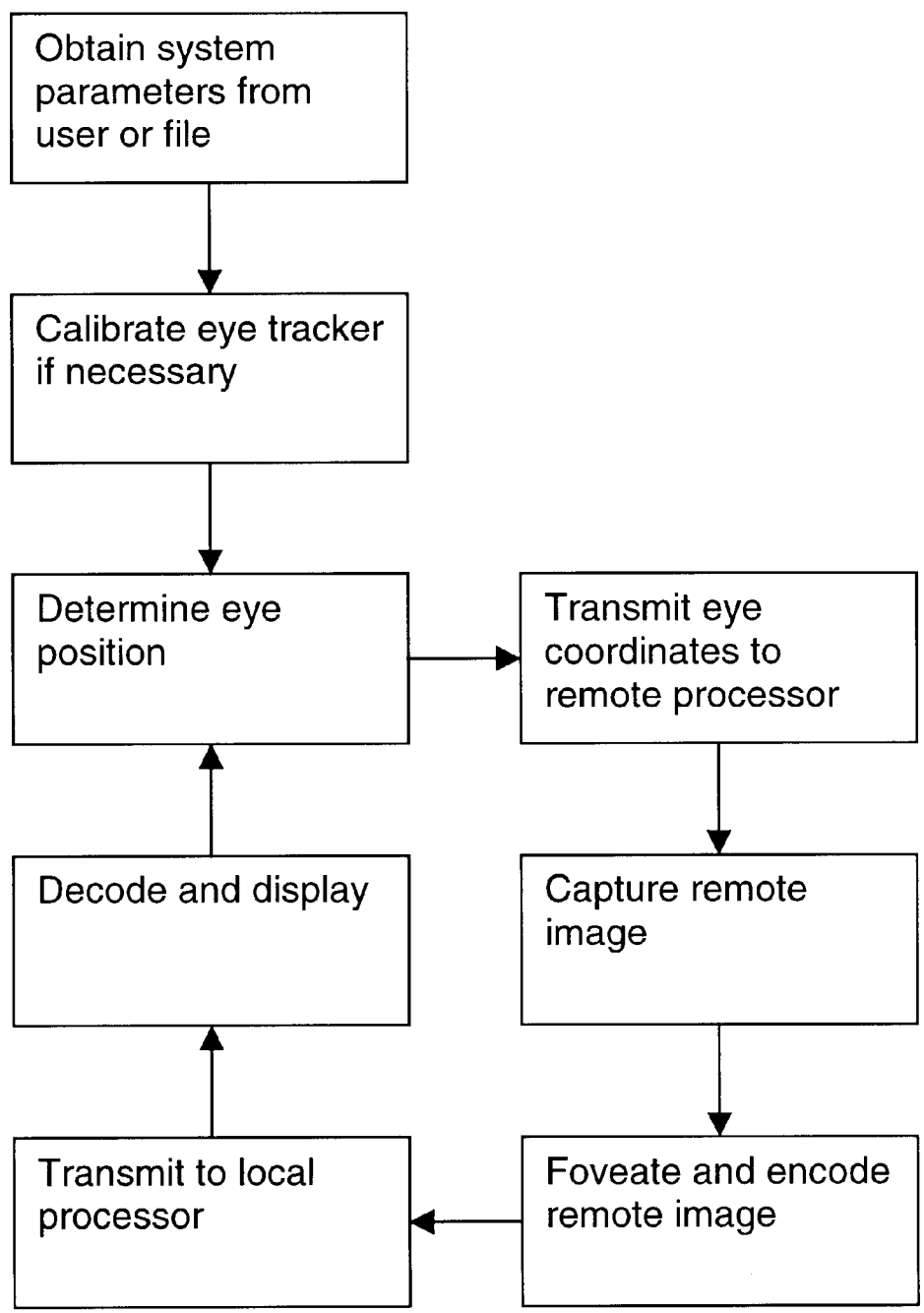
FIG. 2 illustrates a general flow diagram of the operation of the two-processor Foveated Imaging System depicted in FIG. 1.
Figure 3:
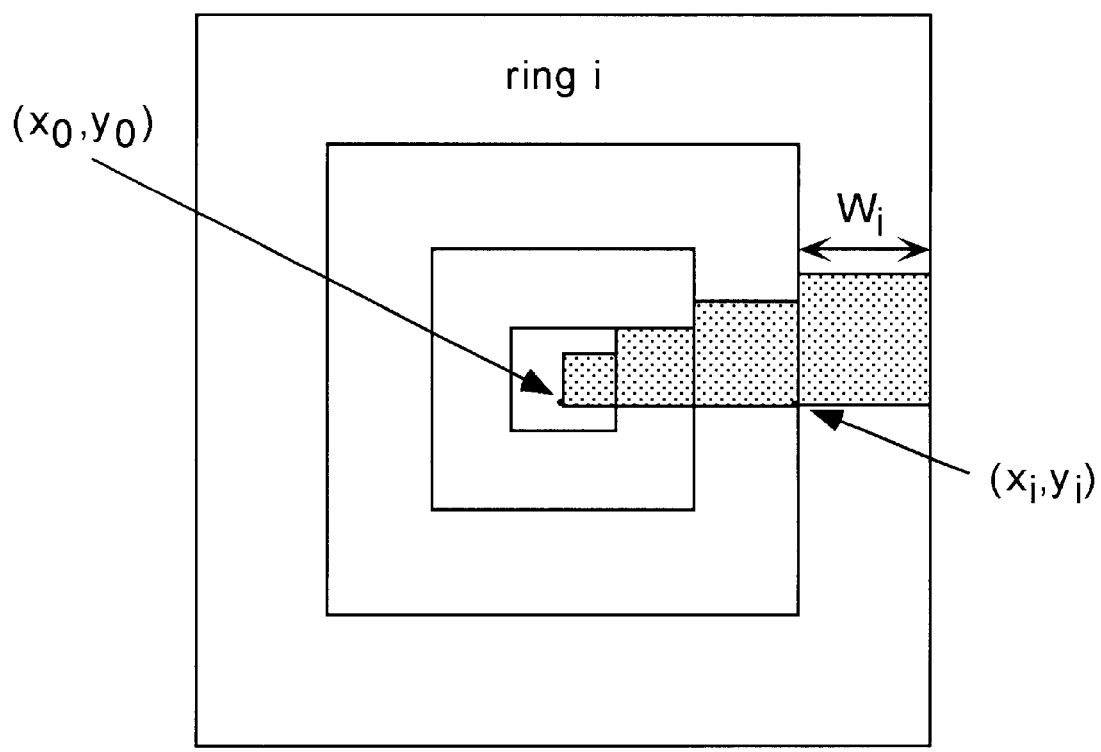
FIG. 3 illustrates a Foveated imaging system SuperPixel pattern arrangement called a ResolutionGrid.
Figure 4:
FIG. 4 is a 1024×1024 foveated image (Mode 1).
Figure 5:
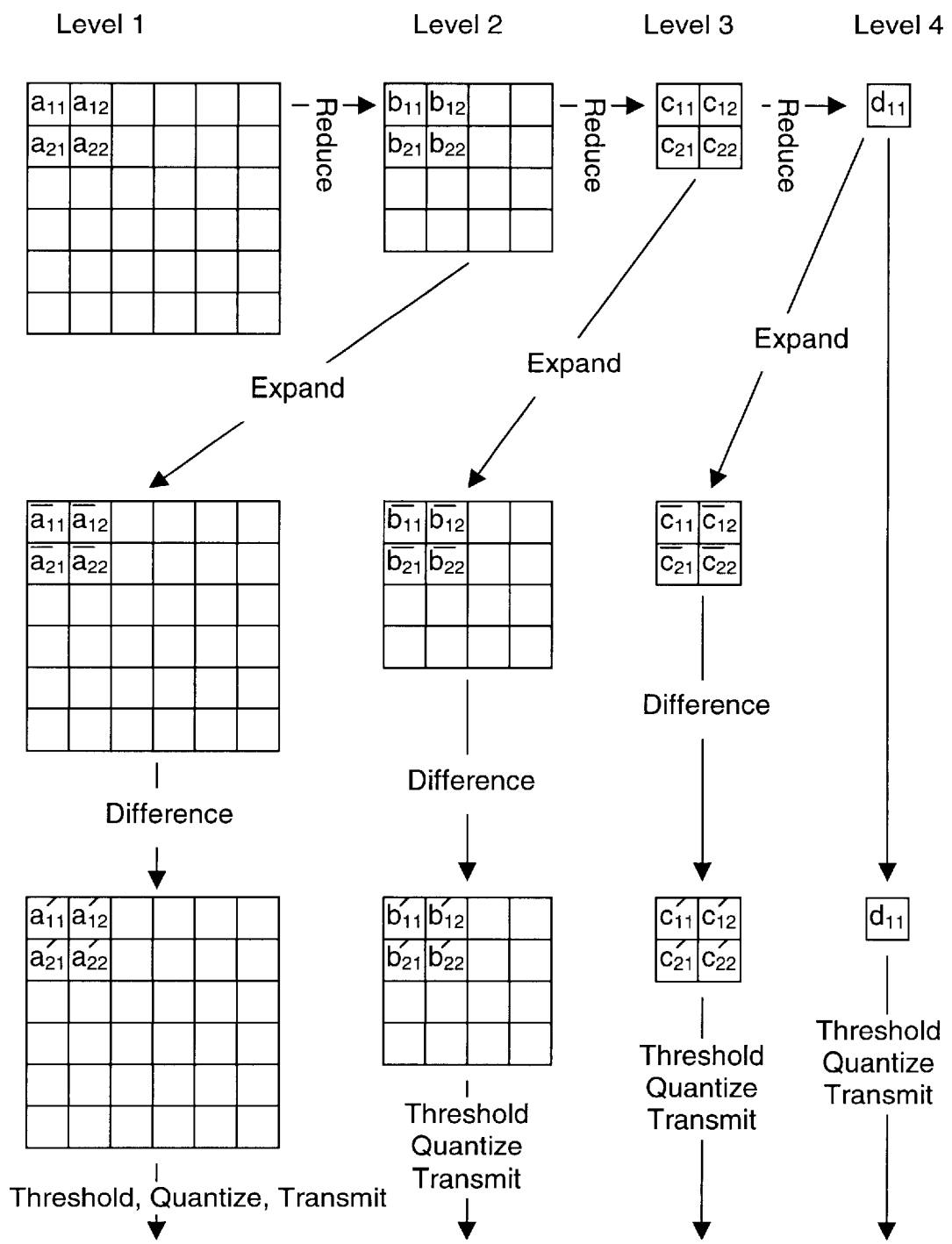
FIG. 5 is an exemplar of how a Foveated Laplacian Pyramid may be computed.
Figure 6:
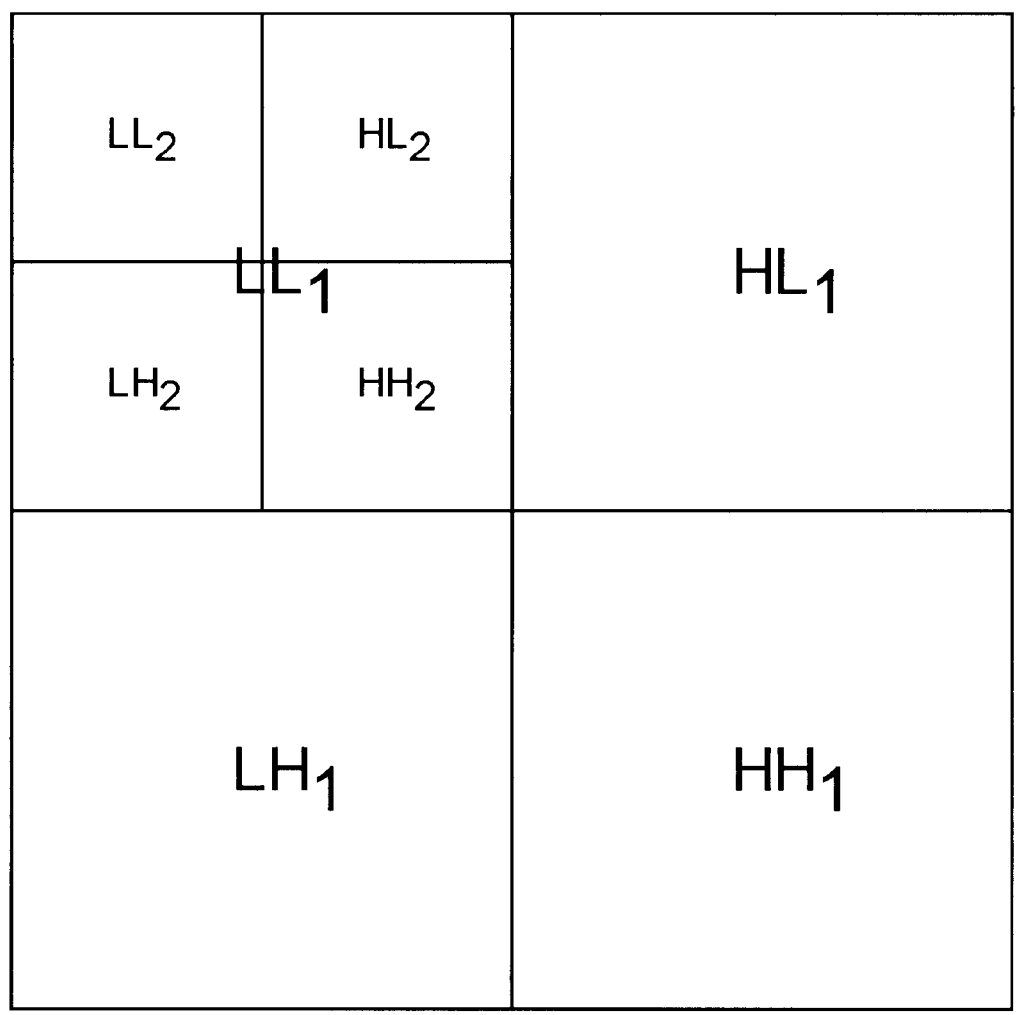
FIG. 6 is a depiction of two levels of a Foveated Wavelet Pyramid.

REDUCE. In the 2×2 version, the REDUCE operation works as follows. Each 2×2 block in Level l is averaged to obtain a pixel in level l+1. For example, as shown in FIG. 5 and FIG. 14, $$b_{11} = \frac{a_{11} + a_{12} + a_{21} + a_{22}}{4} \qquad (7)$$

In the 3×3 version shown in FIG. 15, the REDUCE operation works as follows. Each 3×3 block in Level l is averaged using the following weighing function to obtain a pixel in Level l+1:

$$W = \begin{bmatrix} 1/16 & 1/8 & 1/16 \\ 1/8 & 1/4 & 1/8 \\ 1/16 & 1/8 & 1/16 \end{bmatrix} \qquad (8)$$

For example, $$b_{11} = \frac{a_{11} + 2a_{12} + a_{13}}{16} + \frac{a_{21} + 2a_{22} + a_{23}}{8} + \frac{a_{31} + 2a_{32} + a_{33}}{16} \qquad (9)$$

$$b_{12} = \frac{a_{13} + 2a_{14} + a_{15}}{16} + \frac{a_{23} + 2a_{24} + a_{25}}{8} + \frac{a_{33} + 2a_{34} + a_{35}}{16} \qquad (10)$$

EXPAND. The EXPAND operation for the 2×2 version works as follows and as shown in FIG. 16. First note that the solid dots at the grid intersection, at the top of FIG. 5, show the appropriate spatial location of the down-sampled pixels representing the 2×2 block averages. Thus, for example, $b_{11}$ in the Level 2 grid is the local average color (e.g., gray level) at the position indicated by the solid dot in the Level 1 grid. This is illustrated more fully in FIG. 18, where the Level 2 pixels have been overlaid on the Level 1 grid.

The purpose of the EXPAND operation is to interpolate/expand the reduced image to its size prior to applying the REDUCE operation. For each pixel location in the expanded image, the nearest three pixels in the reduced image are found. For example, the three pixels in the reduced image that are nearest to $a_{22}$ are $b_{11}$, $b_{12}$ and $b_{21}$. The three nearest pixels define a plane in color (or gray scale) space. The interpolated value is obtained by evaluating the color plane at the location of the pixel in the expanded image. The algebra of this calculation is to first find the average of the two pixels defining each of the perpendicular sides of the triangle and then to find the average of those two averages. For example, $$\bar{a}_{22} = \frac{\frac{b_{11}+b_{12}}{2} + \frac{b_{11}+b_{21}}{2}}{2} = \frac{b_{11}}{2} + \frac{b_{12}+b_{21}}{4} \qquad (11)$$

Similarly, $$\bar{a}_{23} = \frac{b_{12}}{2} + \frac{b_{11}+b_{22}}{4}, \bar{a}_{33} = \frac{b_{22}}{2} + \frac{b_{12}+b_{21}}{4}, \qquad (12)$$

$$\bar{a}_{32} = \frac{b_{21}}{2} + \frac{b_{11}+b_{22}}{4}$$

The EXPAND operation for the 3×3 version is simpler. The sold dots in FIG. 19 show the appropriate spatial locations of the down-sampled pixels representing the 3×3 averages. The interpolated values are obtained by bi-linear interpolation. The interpolated pixels between the level l+1 pixels are obtained by simple averaging. For example, $$\bar{a}_{43} = \frac{b_{21}+b_{22}}{2} \text{ and } \bar{a}_{34} = \frac{b_{12}+b_{22}}{2} \qquad (13)$$

The remaining interpolated pixels are obtained by averaging the initially interpolated pixels. For example, $$\bar{a}_{33} = \frac{\bar{a}_{23}+\bar{a}_{43}}{2} \qquad (14)$$

(See also FIG. 18).

DIFFERENCE. The DIFFERENCE operation is to simply subtract the expanded image from the starting image. For example, for each location ij in the Level 1 (FIG. 5), $$a_{ij} = a_{ij} - \bar{a}_{ij} \qquad (15)$$

THRESHOLD. The color (or gray level) of each pixel, in each difference image, is thresholded in a fashion that varies with level in the pyramid and with distance from the point of fixation (eccentricity). Different threshold functions can be selected based upon the application. Here is described a particular threshold function for gray scale images. To maximize perceptual image quality the inventors have implemented a threshold function which is consistent with measurements of contrast sensitivity in the human visual system as function of spatial frequency and retinal eccentricity (Wilson et al. 1990; Geisler and Banks, 1995).

Let $x_0, y_0$ be the point of fixation in the image expressed in degrees of visual angle from the center of the image. If a pixel is located at position x, y, then the eccentricity, e, is given by:

$$e = \sqrt{(x-x_0)^2 + (y-y_0)^2} \qquad (16)$$

The threshold function is given by the following equation:

$$G_T(e,l) = G_{max} \cdot C_T(e,l) \qquad (17)$$

where $G_{max}$ is the maximum possible absolute value in the difference image (e.g., 128 for 8-bit gray level), and $C_T(e,l)$ is the human contrast threshold for the eccentricity, e, and for the spatial frequency passband associated with Level l. By definition the maximum contrast threshold is 1.0.

The purpose of the threshold is to eliminate all difference pixels which are below human contrast threshold. If G is the value of the pixel at location x,y in the difference image for level l then the post-threshold value is given by, $$G' \begin{cases} G - G_T(e, 1) & \text{if } G \geq G_T(e, 1) \\ G + G_T(e, 1) & \text{if } G \leq -G_T(e, 1) \\ 0 & \text{otherwise} \end{cases} \quad (18)$$

Notice that when contrast threshold for a pixel reaches a value of 1.0 then difference-image value cannot exceed the threshold, and hence the pixel need not be transmitted. Additional compression is obtained because equation (18) reduces the range of difference values.

In the current version of the algorithm we use the following formula for human contrast threshold although other similar formulas could be used:

$$C_T(e, 1) + \min\left(C_0 \exp\left(a\left(\frac{u_1(e + e_2)}{e_2}\right)^2\right), 1\right) \quad (19)$$

where $C_0$ is the minimum contrast threshold (across all spatial frequencies and eccentricities), $u_1$ is the dominant spatial frequency of the passband of Level l, $e_2$ is the eccentricity at which human spatial resolution falls to one-half the resolution at zero eccentricity and $\alpha$ is a constant. The inventors have found that this formula provides a reasonable approximation to the falloff in the contrast sensitivity of the human visual system as a function of spatial frequency $u_1$ and eccentricity e.

Setting $C_T(e,1)$ to 1.0 and solving for e yields a formula which gives the eccentricity, $e_{max}$, beyond which it is unnecessary to transmit pixel information and unnecessary to perform the EXPAND operation:

$$e_{max} = \frac{e_2}{u_1} \sqrt{\frac{\ln C_0}{-\alpha}} - e_2 \quad (20)$$

For low levels (e.g., Level 1) the dominant spatial frequency, $u_1$, is high and hence $e_{max}$ is small. Thus, the greatest compression and computational savings are obtained for the largest size difference image.

QUANTIZE. Further compression is obtained by quantization. Many image compression algorithms make use of the fact that humans are able to resolve fewer levels of gray in higher spatial frequency bands than in low frequency bands. We also allow the possibility of having the level quantization vary with retinal eccentricity. If G' is the thresholded value of the difference-image pixel at location x,y, then the value after quantization is given by, $$G'' = \text{NINT}(Q(e,1) \cdot G') \quad (21)$$

where NINT is the "nearest integer" function, and Q(e,1) is the quantization function:

$$0 \leq Q(e,1) \leq 1.0 \quad (22)$$

LOSSLESS COMPRESSION. The final step before transmission is lossless compression. (1) If the point of foveation has not changed then, for each level of the pyramid, only the difference between the current compressed image and the previous image is transmitted. If the point of foveation has changed then frame differencing is not used. (2) Huffman or arithmetic coding is applied to the final images for each level of the pyramid.

DECODING. Following transmission, the image data is decoded and displayed. The decoding proceeds in the reverse order of the coding. (1) Reverse Huffman or arithmetic coding. (2) Add the difference image to the previous image (if point of fixation was the same). (3) Divide G" by Q(e,1) to expand the gray levels to G' values. (4) Add $G_T(e,1)$ to G' if G'>0, subtract $G_T(e,1)$ from G' if G'<, 0 to expand gray levels to G values. (5) Decode the pyramid to create the final transmitted image. For example, decoding of the coded video image data of FIG. 5 would proceed as follows: EXPAND the Level 4 image and ADD the result to the Level 3 difference image to obtain the Level 3 image, EXPAND the Level 3 image and ADD the result to the Level 2 difference image to obtain the Level 2 image, EXPAND the Level 2 image and ADD the result to the Level 1 difference image to obtain the Level 1 image.

Note that for decoding it is necessary to apply EXPAND to the entire image at each level (se FIG. 13). Whereas, during coding it is only necessary to apply EXPAND within the region defined by $e_{max}$(see FIG. 12).

4.3 Foveated Wavelet Pyramid

The Foveated Wavelet Pyramid may be implemented in $C^{++}$ (Watcom $C/C^{++}$) on an Intel Pentium® processor. The computations can be of the form typical in the literature, with the addition of the modifications for foveated imaging described above. Specifically, the THRESHOLD and QUANTIZE operations will be applied to each of the subimages. The only difference is that l in equations (17)–(22) will now represent a subimage of the wavelet pyramid, and $u_l$ will represent the dominant spatial frequency of the passband associated with that subimage. Equation (20) will be utilized to determine the range of elements for which the high-pass filtering (h) needs to be computed.

4.4 Foveated Block DCT

The Foveated Block DCT may be implemented in $C^{++}$ (Watcom $C/C^{++}$) on an Intel Pentiums processor. The computations will be of the form typical in the literature, with the addition of the modifications for foveated imaging described in 2.1. Specifically, the THRESHOLD and QUANTIZE operations will be applied to each of DCT components (coefficients) computed in each block. The only difference is that l in equations (17)–(22) will now represent a particular DCT component (i.e., basis function) in a particular block, $u_l$ will represent the dominant spatial frequency of the component, and e will represent the eccentricity of the center of the particular block. Equation (20) will be utilized to determine those blocks for which each DCT component must be computed.

4.5 FIS Perceptual Evaluation

The current invention (running under Mode 1) has been evaluated for perceptual performance using a conventional 21 inch video display monitor. The images were 256×256, 8 bit gray scale images, having a 20° field of view, displayed with eye movement update rates of 30 Hz, at a frame rate of 60 Hz, and with a half-resolution constant ($e_2$) of 2.5°. The images were selected to test the perception of a number of probable image types: a letter chart (evaluation of visual clarity in a reading task), a face (evaluation of video telecommunication systems), and a natural environment scene (evaluation of cluttered, high detail images). User reports of the subjective quality of the displays were used in the evaluation. All subjects have reported smooth, accurate tracking and excellent overall functioning of the foveating algorithms. Upon steady fixation, most subjects noted that they were aware of the reduced resolution in the peripheral visual field, but that the effect was minimal and had only a small impact on the perceived quality of the image.

In a more quantitative study, the inventors measured visual search performance (in Mode 1) for a 1.0×0.60 target in natural scenes, under three different conditions: (1) foveated imaging of 20×20° images, (2) windowed viewing (4.9×4.9°) with the number of pixels equal to that of the foveated image, and (3) constant resolution viewing (20× 20°) with the number of pixels equal to that of the foveated image. The results showed that the search speed and accuracy was much greater for the foveated imaging. These results illustrate the potential value of the foveated imaging system in important real-world applications where transmission bandwidth is limited.

4.6 Computational Performance and Bandwidth Reduction

Use of the Foveated Imaging System has demonstrated that significant bandwidth reduction can be achieved, while still maintaining access to high detail at any point of a given image. In Mode 1, using 19×22.5 cm. images, at a viewing distance of 30 cm, with a half resolution constant ($e_2$) of 2.5° and a foveal SuperPixel size of 1 pixel, the inventors are able to achieve bandwidth reductions of 97% (a factor of 32) for 644×768 images, on a 200 mHz Pentium® computer. For these systems parameters and images, the eye-movement update rate for thee display exceeded 12 Hz for 24-bit color images, and exceeded 17 Hz for 8-bit gray scale images (the refresh rate of the display was 60 Hz). These bandwidth reductions are independent of the particular images and are obtained without any form of secondary compression. A computer coding used in a preferred embodiment of the present invention is included with this application as an Appendix I.

Secondary image compression schemes, such as thresholding, quantization, and image-frame differencing, can be used in conjunction with the foveated imaging system. The effects of such secondary compression are essentially multiplicative; for example, a factor of 20 in secondary compression would yield an overall compression factor of 640.

Non-foveated Laplacian and wavelet pyramids often produce quite acceptable 8-bit gray images with bit rates of 0.1–0.5 bits/pixel (Burt & Adelson, 1984; Said & Pearlman, 1996). The Foveated Laplacian and Foveated Wavelet Pyramids should produce quite acceptable foveated images at bit rates many times lower.

It will be obvious to those having skill in the art that many changes may be made in the above-described details of a preferred embodiment of the present invention without departing from the underlying principles thereof. The scope of the present invention should, therefore, be determined only by the following claims.

We claim:

1. A method for forming a compressed image, the method comprising:
   acquiring an image;
   reducing the image with a Foveated Laplacian pyramid algorithm to form a plurality of down-sampled images, the down-sampled images decreasing in resolution from a highest to a lowest resolution;
   designating a subset of each of the plurality of down-sampled images to form a plurality of subset images; and
   processing the lowest resolution down-sampled image with the plurality of subset images to form the compressed image.

2. The method of claim 1, wherein the processing comprises real-time processing.

3. The method of claim 1, wherein the processing comprises:
   expanding the plurality of subset images to form a plurality of expanded subset images; and
   subtracting the plurality of expanded subset images from the plurality of down-sampled images to form a plurality of difference images.

4. The method of claim 3, wherein the processing further comprises:
   thresholding the plurality of difference images to form a plurality of threshold images;
   quantizing the plurality of threshold images;
   compressing the plurality of threshold images using a lossless compression algorithm to form a plurality of compression images;
   compressing a down-sampled image using a lossless compression algorithm to form a compressed down-sampled image; and
   transmitting the compressed down-sampled image with the plurality of compression images.

5. The method of claim 1, wherein the designating corresponds to one or more fixation points.

6. The method of claim 1, wherein the designating corresponds one or more screen coordinates of a pointing device.

7. The method of claim 6, wherein the pointing device comprises a mouse.

8. The method of claim 1, wherein the compressed image comprises a video image.

9. A method for forming a compressed image in real-time, the method comprising:
   acquiring an image;
   reducing the image with a Foreated Laplacian pyramid algorithm to form a plurality of down-sampled images, the down-sampled images decreasing in resolution from a highest to a lowest resolution;
   designating a subset of each of the plurality of down-sampled images to form a plurality of subset images;
   expanding the plurality of subset images to form a plurality of expanded subset images;
   subtracting the plurality of expanded subset images from the plurality of down-sampled images to form a plurality of difference images; and
   processing the lowest resolution down-sampled image with the plurality of difference images to form the compressed image.

10. The method of claim 9, wherein the processing comprises:
    thresholding the plurality of difference images to form a plurality of threshold images;
    quantizing the plurality of threshold images;
    compressing the plurality of threshold images using a lossless compression algorithm to form a plurality of compression images; and
    transmitting the lowest resolution down-sampled image with the plurality of compression images.

11. The method of claim 9, wherein the designating corresponds to one or more fixation points.

12. The method of claim 11, wherein the pointing device comprises a mouse.

13. The method of claim 9, wherein the designating corresponds one or more screen coordinates of a pointing device.

* * * * *

UNITED STATES PATENT AND TRADEMARK OFFICE
CERTIFICATE OF CORRECTION

PATENT NO. : 6,252,989 B1 Page 1 of 1
DATED : June 26, 2001
INVENTOR(S) : Geisler et al.

It is certified that error appears in the above-identified patent and that said Letters Patent is hereby corrected as shown below:

<u>Column 18, claim 9,</u>
Line 35, please delete "Foreated" and insert -- Foveated -- therefore.

Signed and Sealed this

Ninth Day of April, 2002

Attest:

*Attesting Officer*

JAMES E. ROGAN
*Director of the United States Patent and Trademark Office*